United States Patent
Tsang

[19]

[11] Patent Number: 6,092,118
[45] Date of Patent: Jul. 18, 2000

[54] INTER-COMPUTER COMMUNICATION METHOD AND APPARATUS UTILIZING CLOCKED MESSAGE PLAYBACK AND MESSAGE FORMAT DEFINITION FILES

[75] Inventor: Shiu Ming Tsang, Queens, N.Y.

[73] Assignee: Northrop Grumman Corporation, Los Angeles, Calif.

[21] Appl. No.: 08/924,529

[22] Filed: Jul. 6, 1998

[51] Int. Cl.[7] .................................................. G06F 15/16
[52] U.S. Cl. ......................... 709/246; 709/207; 709/228; 709/236
[58] Field of Search ........................... 395/200.76, 200.6, 395/200.66; 709/246–228, 236, 207

[56] References Cited

U.S. PATENT DOCUMENTS

| | | | |
|---|---|---|---|
| 5,063,494 | 11/1991 | Davidowski et al. | 395/800 |
| 5,146,572 | 9/1992 | Bailey et al. | 395/425 |
| 5,524,137 | 6/1996 | Rhee | 379/67 |
| 5,594,798 | 1/1997 | Cox et al. | 380/49 |
| 5,608,874 | 3/1997 | Ogawa et al. | 395/200.15 |
| 5,627,997 | 5/1997 | Pearson et al. | 395/500 |
| 5,715,397 | 2/1998 | Ogawa et al. | 395/200.18 |
| 5,818,603 | 10/1998 | Motoyama | 358/296 |
| 5,835,789 | 11/1998 | Ueda et al. | 395/853 |

*Primary Examiner*—Zarni Maung
*Assistant Examiner*—Saleh Najjar

[57] ABSTRACT

An inter-computer communication method and apparatus permits inter-computer communication of computer messages having a format easily defined by user in an ASCII configuration file. Instead of rewriting code to accommodate a differently formatted message, the invention utilizes an ASCII configuration file that can be easily created and changed to define various message formats. Message encodation involves inserting a unique header in the message identifying the message format and building a message according to the defined format. Message decodation parses this header to access the configuration file and determine message format. A message processing apparatus processes inter-computer messages in one of three configurations including a first configuration for processing input messages from a communications port by controlling a message decoder to decode input messages and send the decoded input messages to a processor for manipulation by an application program; a second configuration for playing back an input message from the message log and sending the read input message to the processor for manipulation by the application program; and a third configuration for logging inputs by routing input messages from the communications port to the message log.

31 Claims, 13 Drawing Sheets

INTER-COMPUTER COMMUNICATION METHOD AND APPARATUS UTILIZING CLOCKED MESSAGE PLAYBACK AND MESSAGE FORMAT DEFINITION FILES

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention generally relates to improvements in inter-computer communications. More particularly, this invention relates to a method, apparatus and article of manufacture which encodes, decodes, receives and transmits inter-computer messages of various formats.

2. Description of Related Art

Conventionally, communications software is specifically developed for a particular application. Such conventional communication software is designed to receive and transmit computer messages in specific, limited formats. In other words, typical software code imbeds the format of computer messages within the code such that the code expects a particular format for any data to be received or transmitted.

If a computer message having a different format is received, such conventional software is generally unable to decode or otherwise utilize such differently formatted messages. To accommodate such different formats, the software engineer must rewrite the code to accept the differently formatted message.

Furthermore, after specific messages are coded for an application, most conventional communication software, must be rewritten or otherwise need additional special purpose code to be written for other requirements such as event logging, time stamping, scenario playback, real-time/off-line simulations and marketing demonstrations. In most cases, such as that of at least two radar systems employed by the Federal Aviation Administration (FAA), custom software is written for some of those functions. Other functions are deemed too expensive and timely to implement. In this invention, all these functions are built in and ready for deployment.

SUMMARY OF THE INVENTION

An object of the invention is to solve the above-noted problems in the conventional communications software.

It is another object of the invention to provide the capability of receiving and transmitting computer messages having an arbitrary format.

It is yet another object of the invention to provide the capability of encoding and decoding messages from and into any desired format.

It is still another object of the invention to utilize a configuration file to easily configure various computer message formats to permit reception, transmission, encoding and decoding of computer messages.

It is still another object of the invention to utilize a header which may be placed at the beginning of each computer message to positively identify the format of that message with a code that can be used to access the configuration file which stores a complete definition of the message format.

The above objects are achieved by providing a message processing apparatus for processing inter-computer messages including a communications port (COMPORT) transmitting messages between the message processing apparatus and another device or application program; a message log storing input messages from the communications port; a message playback device for playing back stored messages from the message log; a message decoder for decoding messages; a user interface providing a user with interactive control of the apparatus by generating control signals in response to user interaction; a processor executing an application program and receiving control signals from the user interface permitting control of the application program; and a menu processor utilizing the user interface to present a user with a menu of apparatus configurations wherein each apparatus configuration configures the apparatus to perform a different function, the menu processor also permitting the user to select one of the apparatus configurations including:

a first configuration for processing input messages from the COMPORT by controlling the message decoder to decode input messages from the comport and send the decoded input messages to the processor for manipulation by the application program, a second configuration for playing back an input message from the message log by reading the input message from the message log and sending the read input message to the processor for manipulation by the application program, and a third configuration for logging comport inputs by routing input messages from the COMPORT to the message log.

The above objects are further achieved by providing a computer implemented method of encoding data into a message format specified by an ASCII message definition file, including the steps of: reading the ASCII message format definition file to extract header data identifying the message format, copying the extracted header data into a message string, reading the ASCII message format definition file to extract format information including a number of groups in the message format and a number and type of fields in each group, and writing data into the message string according to the format information extracted by said reading step.

The above objects are still further achieved by providing a computer implemented method of decoding a computer message, including the steps of: receiving the computer message; extracting header data from the received computer message; matching the extracted header data against header data in an ASCII message format definition file; determining the format of the computer message based on the matching step including the substeps of determining how many groups are in the message and how many and what types of fields are in each group; parsing the computer message into fields according to the format determined in the determining step; and decoding each field according to the format determined in said determining step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First, the front end of the invention will be described with reference to FIG. 1. The front end of the system allows a user to interact with other elements of the invention and with the application program 150 and is, therefore, otherwise known as a user interface.

Figure 1:
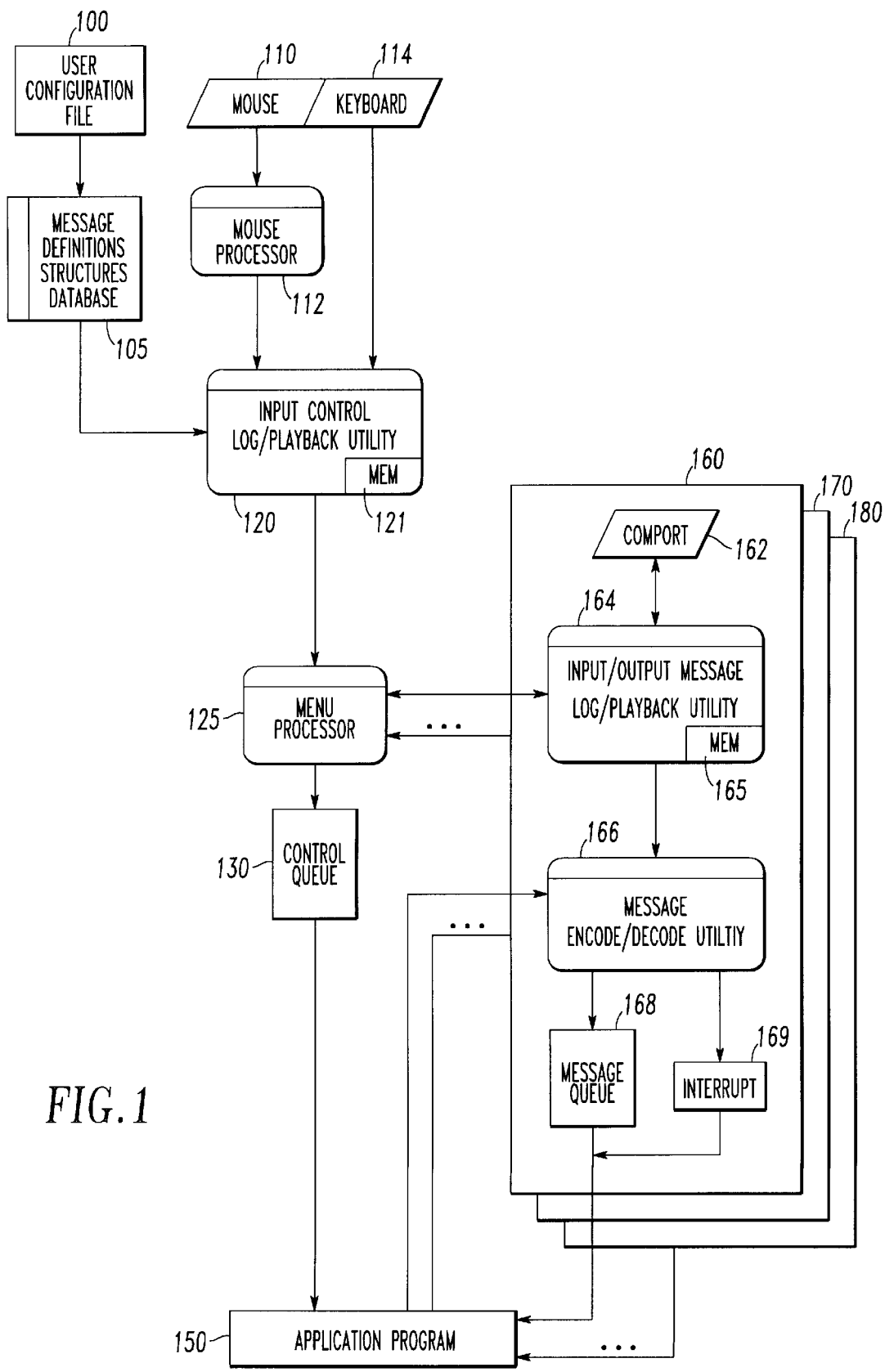
FIG. 1 is an inter-computer communications block diagram illustrating hardware which may be utilized to construct the present invention.

The user interface, as shown in FIG. 1, generally includes a mouse 110 and keyboard 114 which may be accessed by the user to input commands, data, etc. The inputs from mouse 110 are processed by mouse processor 112. The input controller 120 receives inputs from the mouse 110 via mouse processor 112 and the keyboard 114.

As shown in FIG. 1, input controller 120 includes a log/playback utility which may be used to log or record inputs from the mouse 110 and keyboard 114 in control signal memory device 121 to preserve the sequence of events as input by the user. A menu processor 125 is connected to input controller 120. Menu processor 125 is also connected to message processors 160,170,180 that process inter-computer messages by receiving, decoding, encoding, and transmitting inter-computer messages between application program 150 and another application program or I/O device via comport 162.

Although three such message processors 160,170 and 180 are shown, it is to be understood that only one is necessary and that more than three such message processors could be networked using known techniques.

The application program 150 is a generalized term which encompasses known software application programs executing in a computer and dedicated hardware or firmware embodiments of known application programs that require a facility to receive and/or transmit encoded messages.

The menu processor 125 presents the user with an interactive menu that can be selected by the user to route controls to the application program 150 via control queue 130 in one of three methods.

First of all, controls may be routed from the keyboard 114 and/or mouse 110 directly via mouse processor 112 and input controller 120 for interactive control of the application program 150 or indirectly over a communication link such as communications port (COMPORT) 162.

During such direct or indirect interactive control of the application program 150, the user inputs may be time stamped and written to a log file in control signal memory 121 by input controller 120. With such a log file, a third method of control is possible which includes the ability to playback controls previously logged by input controller 120 for such purposes as debugging and marketing demonstrations.

Furthermore, each inter-computer communicator 160, 170,180 includes a COMPORT 162 that receives and transmits data such as computer messages with other computers or with other inter-computer communicators 160,170,180. The COMPORT 162 is bidirectionally connected with an input/output log/playback utility 164. As mentioned above in relation to the input controller 120, such a log/playback utility 164 can be utilized to log inputs received over COMPORT 162 and utilized to playback previously logged inputs.

The inter-computer communicators 160,170,180 further include a message encode/decode utility 166 which encodes and decodes inter-computer messages as will be further described below. The encoded message can then be placed on message queue 168 to await acceptance by application program 150 via a communication link. An interrupt such as interrupt 169 can be utilized to notify the application program 150 that a message awaits in message queue 168.

Furthermore, the application program 150 can send an encoded message over communication links to the message encode/decode utility 166 as shown in FIG. 1. Such an encoded message can then be decoded by message encode/decode utility 166, fed to input/output message log/playback utility 164 for transmission to other devices such as inter-computer communicator 170 via COMPORT 162.

FIG. 1 also illustrates the user configuration file 100 which defines the various formats for encoded messages which may be utilized to encode and decode inter-computer messages as further described below. The user configuration file 100 is connected to and used to initialize message definition database 105 that defines the format and structure of several types of messages as described below. Once initialized, the database 105 is available to all elements of FIG. 1.

Figure 2:
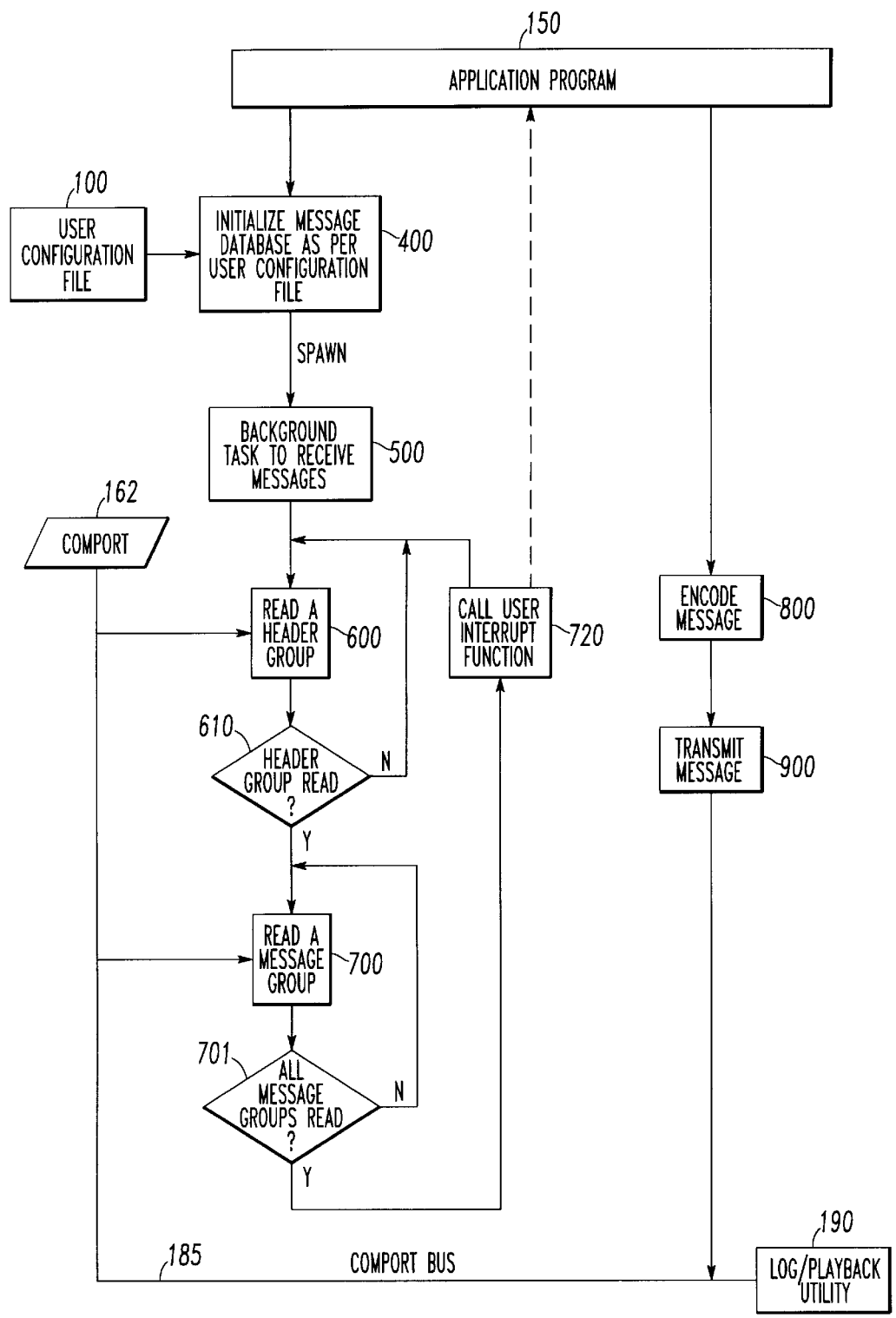
FIG. 2 is a high-level flow chart illustrating a methodology of inter-computer communications according to the present invention.

FIG. 2 is a high-level block diagram describing the overall methodology of the present invention. As shown in FIG. 2, the invention interacts with a conventional application program 150 as will be further described below.

As shown by step 400, the invention initializes the message database 105 as per user configuration file 100. In other words, the user configuration file 100 is utilized to set up or initialize a message database 105. The hierarchy and details of the user configuration file 100 are further described in reference to FIG. 3 below. Furthermore, this initialization routine will be further described with reference to FIG. 4 below.

Database initialization routine 400 also spawns or creates the child process 500 which operates in the background or in another communication processor to receive incoming messages.

The invention further utilizes a receive message background task 500 to receive inter-computer messages via COMPORT 162. In general, background task 500 frees the application program 150 from being interrupted by a newly received message until it is decoded by the message encode/decode utility 166. The receive message background task 500 is preferably a part of the input/output message log/playback utility 164. Further details and a specific implementation of the receive message background task 500 will be described with reference to FIG. 5 below.

After a message has been received by receive message background task 500, the received message is then sent to the message encode/decode utility 166 which decodes this message by executing a program that begins with read a header group step 600. As will be described in more detail with reference to FIG. 3, each computer message, as defined by the user configuration file 100, includes a header group 312 which positively identifies the format or type of encodation for the message attached thereto.

The first step in decoding such a message is to read this header group 312 as shown by read a header group step 600. A test is then employed which tests whether the header group is read in step 610. If step 610 determines that the header group has not been successfully read, then the flow loops back to step 600 which again attempts to read the header group 312 in the newly received message. If the header group 312 is successfully read as determined by step 610, then the flow proceeds to read a message step 700.

Figure 7A:
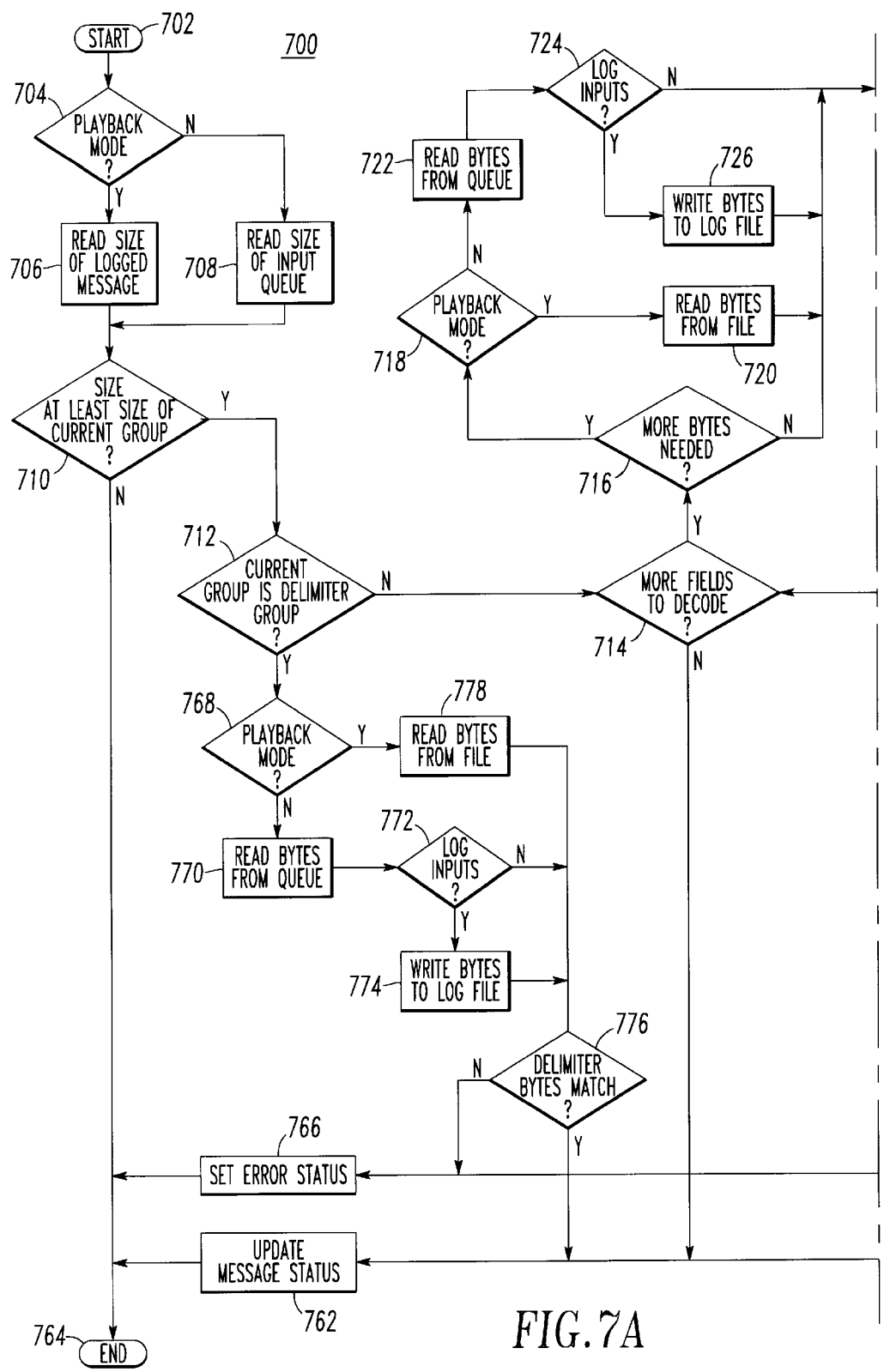
FIG. 7 is a detailed flow chart illustrating a read a message group routine which is another component of the present invention.
Figure 7B:
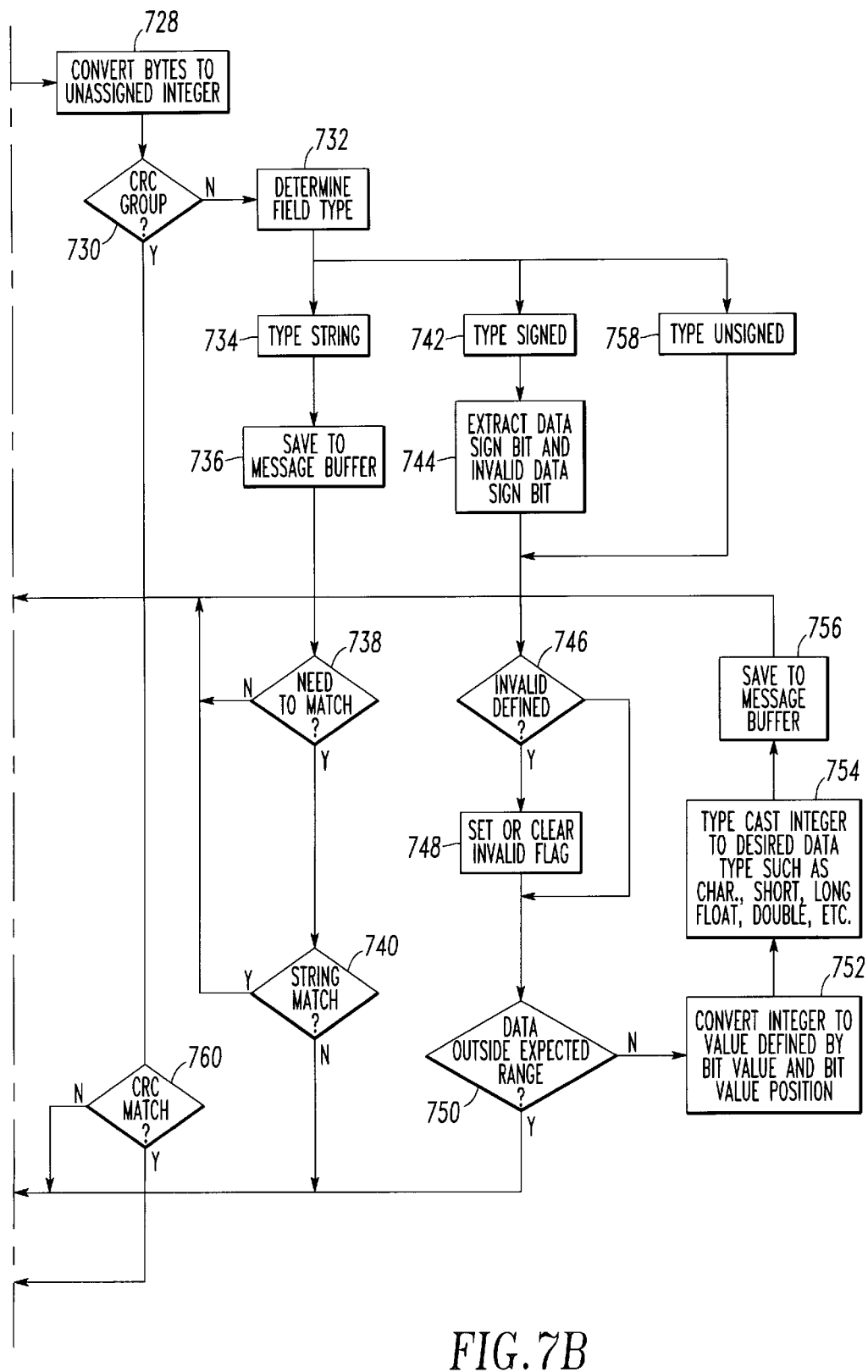

Read a message group step 700 decodes or reads the message according to the header group parsed by read a header group step 600. In general, the read a header group step 700 accesses the initialized message database 105 that is initialized by the user configuration file 100 to decode the message. More specifically, the user configuration file 100 initializes a message database 105 which stores the format for each type of known (defined) inter-computer message. The message database 105 may be accessed by the that is parsed header group parsed by read a header group 600 to access the specific type of message format that has been received by receive message step 500. This decodation process will be further described with reference to FIG. 7 below.

Then step 701 tests whether all message groups have been read. If not, then the process loops back to step 700 which attempts to read another message group.

In this embodiment, the header group 312 specifies the format for a plurality of message groups (e.g., 314–318) within the message 304. In an alternative embodiment, the header group 312 may be placed at the beginning of each message group (e.g., 314–318) and may identify the format for each group within the message. In this alternative embodiment, the step 701 would be unnecessary because each message group (314, 316) would have a unique header group 314 positively identifying the type and format of that particular message group (314, 316).

If step 701 determines that all message groups have been read, then the flow proceeds to call user interrupt step 720. More specifically, step 720 interrupts the application program 150 to notify application program 150 that a new message has been received and successfully decoded and is now ready to be accepted by application program 150.

As further shown in FIG. 2, the invention further includes log/playback utility 190 which can be used to playback a previously recorded computer message which can then be transmitted internally (from an internal memory) or, via COMPORT bus 185, to another message processor 170 having an input/output message utility 164 executing read a header group step 600 or read a message group step 700.

Figure 6:
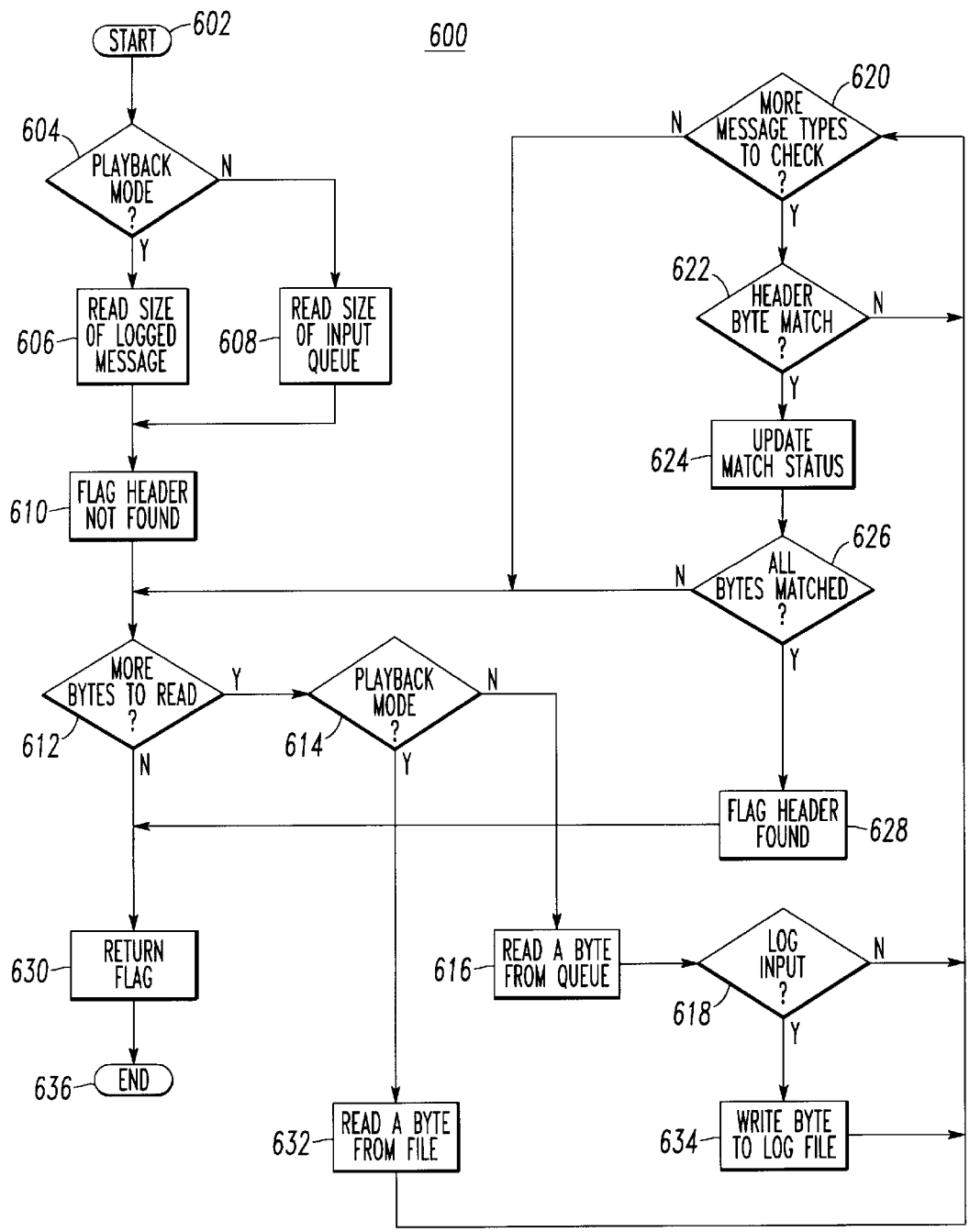
FIG. 6 is a detailed flow chart describing a read a header group routine which is a component of the present invention.

Read a header group step 600 then attempts to read a header group from that message as described in relation to FIG. 6 below.

Alternatively, the log/playback utility 190 may have already parsed the header group and can then thereby transmit the message and parsed header group to read a message group step 700 which utilizes the parsed header group to access the message database 105 and thereby decode the message group.

The invention also encodes a computer message into a desired format and transmits such an encoded message. As shown in FIG. 2, the application program 150 may invoke subroutine 800 to encode the message and subroutine 900 to transmit the message.

The menu processor 125 presents the user with an interactive menu that can be selected by the user to select a transmission mode via the user interface.

When the message processor 160 is remotely located as in some local networks, the comport 162 would have an embedded, conventional application program to decode one of the message groups and route the message to its final destination.

When the encoded message is passed to transmit message step 900, step 900 places the encoded message onto COMPORT bus 185. COMPORT 162 then receives the transmitted message via COMPORT bus 185 for communications to other computers, devices, programs, subprograms, etc. The transmit message step 900 will be further described in reference to FIG. 9 below.

Figure 3:
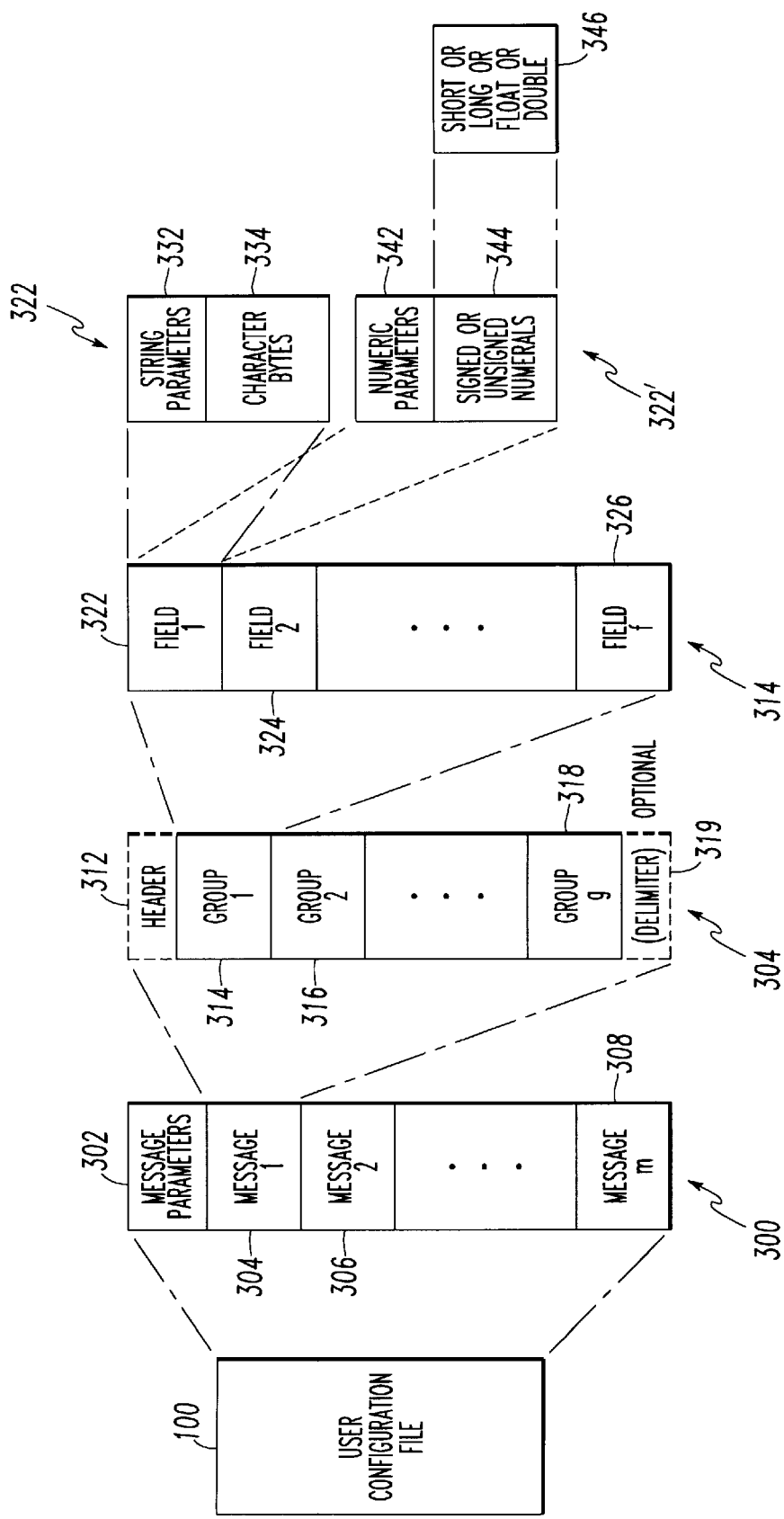
FIG. 3 illustrates a user configuration file hierarchy according to the present invention.

FIG. 3 illustrates the hierarchy of the user configuration file 100 and an inter-computer message 304. As noted above, the user configuration file 100 defines the format for each type of message which may be received, encoded, decoded and transmitted by the invention. More particularly, user configuration file 100 defines the format for a set of defined messages 300. The set of defined messages 300 defines the format for a plurality of messages including messages 304,306,308 (corresponding to message 1, message 2 . . . message m in FIG. 3).

The set of defined messages 300 further includes message parameters 302 which are described in reference to FIG. 4 below.

Moving down the hierarchy, each message such as message 304 includes a plurality of message groups 314,316,318 (corresponding to group 1, group 2 . . . group g in FIG. 3). It should be noted that a message such as message 306 may include only one message group and it is not necessarily limited to a plurality of groups as shown in FIG. 3.

To identify the type of message, a header 312 is included in each message 304,306,308. Preferably, this header group 312 is placed at the beginning of each message 304,306,308.

Alternatively, the header group 312 may be placed at a defined location within the message 304,306,308. In this alternative, a delimiter 319 should be utilized. Delimiter 319 is a conventional delimiter which delimits or marks off the message from a data stream. In other words, a delimiter 319 is a string of unique codes which is utilized to locate a message within a data stream.

In the preferred embodiment, the delimiter 319 is optional. In the alternative embodiment wherein the header 312 is placed a pre-assigned location within the message, the delimiter 319 should be included to provide a reference location which can be utilized to find the header group 312 at a preassigned location with respect to the location of the delimiter 319.

Moving further down the hierarchy, each message group such as message group 314 includes a plurality of fields 322,324,326 (corresponding to field 1, field 2 . . . field f in FIG. 3). Again, it should be noted that each group 314,316, 318 may include only one field and is not limited to the number of fields as shown in FIG. 3.

Moving still further down the hierarchy of the user configuration file 100, each field 322,324,326 includes data in a specific format. As shown in FIG. 3, field 322 may be utilized to encode a string of characters. In this case, field 322 includes a string parameter field 332. String parameter field 322 includes all of the parameters related to the string of characters including the number of characters in the string and the number of matches.

A string of characters is usually used to legibly identify or qualify a group of data in the message, or to encode some high level reference for the data sent. As a simplified example, suppose an application only wishes to receive "updates" and the message may contain "updates" or "status" in its data group. The recipient of these messages may filter out unwanted messages by having the background task match the string "updates" and not be bothered by messages with "status" in a particular string group.

More complicated filters may be designed by having a number of these characteristics encoded in a string of different characters. In the case of high level references, an example may be an airplane's tail number, such as NA1234 which may convey to the recipient that the data sent is with respect to a light weight prop commercial delivery aircraft owned by XYZ corporation.

Following the string parameter field 332, is the actual string or character bytes 334 to be matched.

Alternatively, a field such as field 322 may encode numbers. In this case, field 322' includes a numeric parameter field 342. Numeric parameter field 342 specifies the format of the encoded number including conventional signed, unsigned, short, long, floating or double precision number encodations. If the numeric parameter field 342 specifies signed or unsigned encodation, then a signed or unsigned numeral 344 will follow. Similarly, if the numerical parameter field 342 specifies short, long, float or double precision, then a short, long, float or double precision encoded number will follow.

As described above, the user configuration file 100 has a hierarchy which is shown in FIG. 3 which may be utilized to determine the format of a specific inter-computer message. Also as described above, the user configuration file 100 initializes a message database 105 in step 400. By utilizing a parsed header group 312 as further described below, this message database 105 may be accessed to determine the format of the message.

In this way, a user can easily configure all of the expected formats for inter-computer messages to be utilized with a specific application program 150. Instead of rewriting code to handle and process each specific type of message, the user can simply define the format of the message in the user configuration file 100 and utilize the methods and techniques disclosed herein to access the message database 105 to decode, encode, receive and transmit inter-computer messages having any desired format.

Figure 4A:
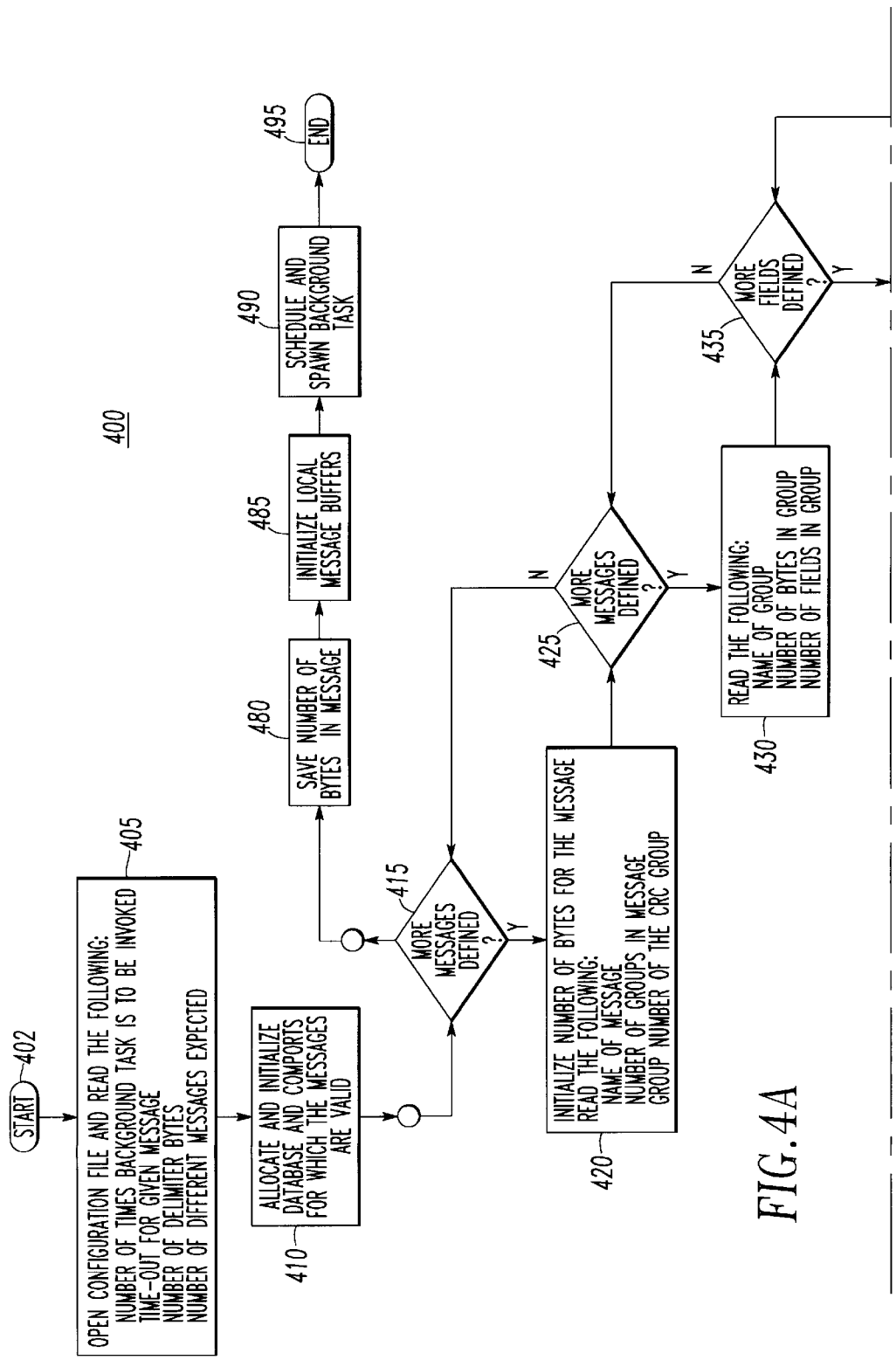
FIG. 4 is a detailed flow chart illustrating a initialization routine according to the present invention.
Figure 4B:
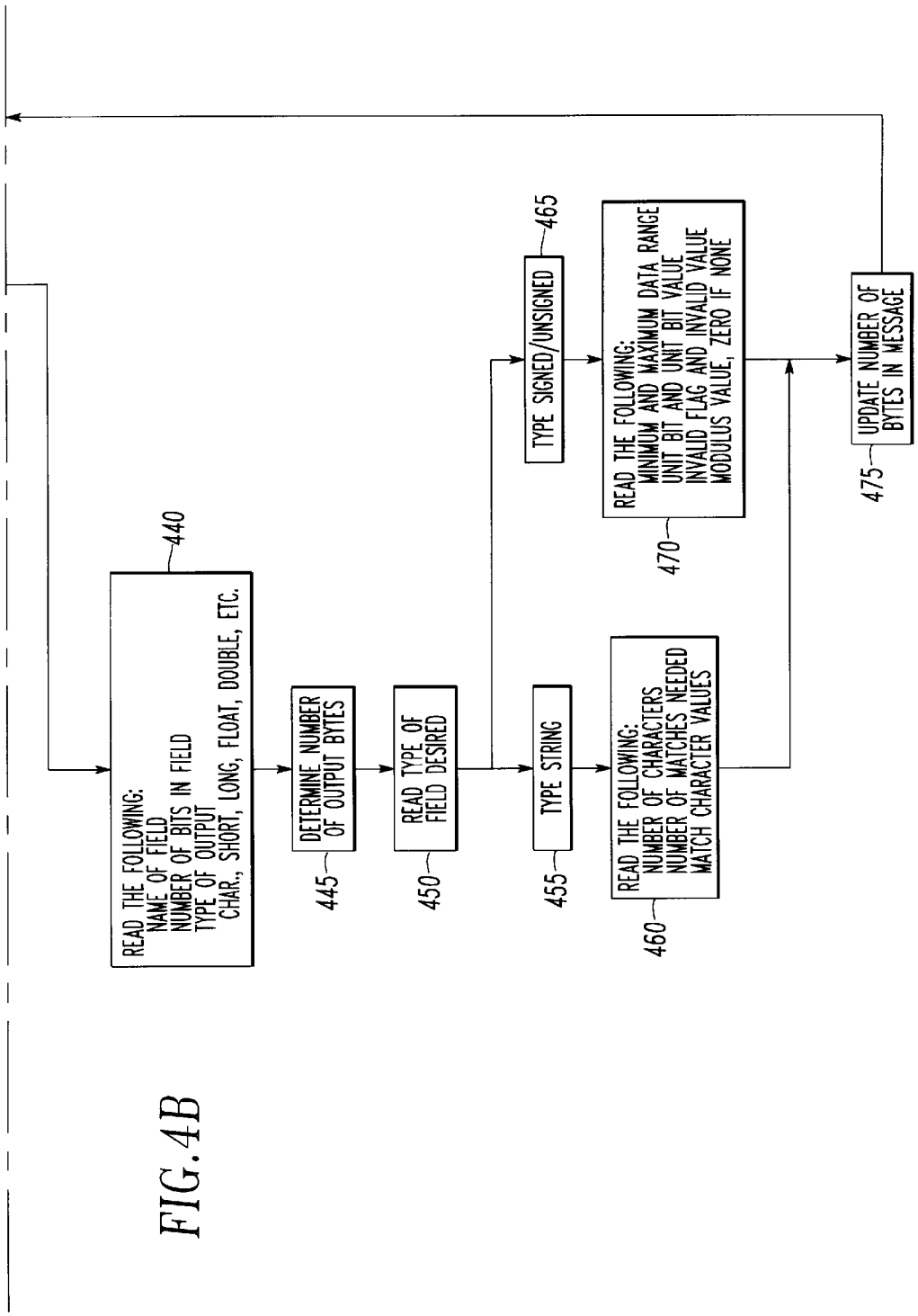

FIG. 4 is a detailed flow chart describing a specific implementation of the message database initialization routine 400 which is generally described above in reference to FIG. 2.

After start step 402, message database initialization routine 400 executes open configuration step 405 which opens the user configuration file 100 and reads information including (1) the number of times the receive message background task 500 is to be invoked, (2) the time-out for a given message, (3) the number of delimiter bytes 319 for each message, (4) the number of header bytes in header group 312, and (5) the number of different types of messages expected or defined within the user configuration file 100. This information is read from the message parameter field 302.

Then, the flow proceeds to allocate and initialize step 410 which initializes the message database 105 based on the user configuration file 100 and allocates COMPORTs such as COMPORT 162 for which the messages are valid.

Then, the flow proceeds to decision step 415 which tests whether additional messages are to be defined within the user configuration file 100 and message database 105. Step 415 tests if all messages defined are read in. Step 415 also permits the user to define additional messages not within the original user configuration file 100. In this way, the user can easily add other types of messages to the user configuration file 100. If no more messages are to be defined, then the flow proceeds to save number of bytes in message step 480 which determines the number of bytes in each message and saves these numbers in the message parameter field 302. Then, the flow proceeds to initialize local message buffer queue 168 within the inter-computer communicator 160,170,180.

Then, the flow proceeds to schedule and spawn background task step 490 which schedules and spawns the receive message background task 500 to permit receipt of a new message and storage of this new message in the local message buffer queue 168. The database initialization routine 400 is then done as indicated by end step 495.

Returning to decision step 415, if additional messages are to be defined by the user or if the user configuration file 100 contains additional message definitions, then the flow proceeds to initialize number of bytes for the message step 420. Step 420 initializes the number of bytes for the message to be defined by reading (inputting) information from the user configuration file 100 (or inputting this info from the user) including the name of the message, the number of groups in the message and the group number of the cyclic redundancy check (CRC) group.

The CRC group is a conventional data integrity check which may be utilized by the invention to ensure the integrity of received and transmitted messages. Of course, other types of data integrity checks such as a simple parity bit check or checksum may be utilized with the invention.

Then, the flow proceeds to more groups defined decision step 425 which tests whether there are more groups to be defined within the current message. This decision step 425 looks for additional groups within the current message definition in the user configuration file 100 or permits the user to add additional groups to the current message definition. If no more groups are to be defined, then decision step 425 returns to more messages defined decision step 415 to permit additional message definition.

If, on the other hand, the user configuration file 100 contains additional groups in the current message definition or the user wishes to add additional groups to a message, then decision step 425 proceeds to step 430 which reads or inputs the name of the new group, the number of bytes in the group, and the number of fields in the group. The flow then proceeds to more fields defined decision step 435 which permits additional fields to be read from the user configuration file 100 for the current group. Alternatively, step 435 permits the user to add additional fields to the current group. If not, step 435 directs the flow to return to more groups defined decision step 425.

If, on the other hand, there are additional fields for the current group, then the flow proceeds to step 440 which reads (or inputs) the following information: the name of the field, the number of bits in the field, and the type of information in the field (character, short, long, float, double, etc.).

Then, step 445 determines the number of output bytes in the current field.

Then, read type of field desired step 450 reads the type of field (character, short, long, float, double, etc.) that is desired by the user or user configuration file 100 for this field. If a string type field is desired or defined, then the flow proceeds to type string step 455 and then to step 460 which reads the number of characters in the string, the number of matches needed, and the match character values.

If, on the other hand, a signed/unsigned field type is desired or defined, the flow proceeds to type signed/unsigned step 465 and then to step 470 which reads the minimum and maximum data range for the number to be represented in this field, the unit bit and unit bit value, the invalid flag and invalid value, and the modulus value (zero if no modulus value is to be utilized).

For all types of fields, the flow then proceeds to step 475 which updates the number of bytes in the message according to the inputted data described above. The flow then skips back to more fields defined decision step 435 to permit the definitions of additional field(s). If no additional field is to be defined, the flow proceeds back to more groups defined decision step 425 permit definitions of additional group(s). If no additional group is to defined, the flow skips back to more messages defined decision step 415 to permit additional messages definitions to be initialized in the message database 105. If no additional messages are defined, the flow proceeds to step 480 which is described above.

By using the initialization routine 400, a particular implementation which is described in detail above, the user can initialize the message database 105 from the user configuration file 100, add to the user configuration file 100 and message database 105 by further defining messages, groups and fields within an existing user configuration file and newly create a user configuration file 100 and message database 105.

Receive Message Background Routine 500

Figure 5A:
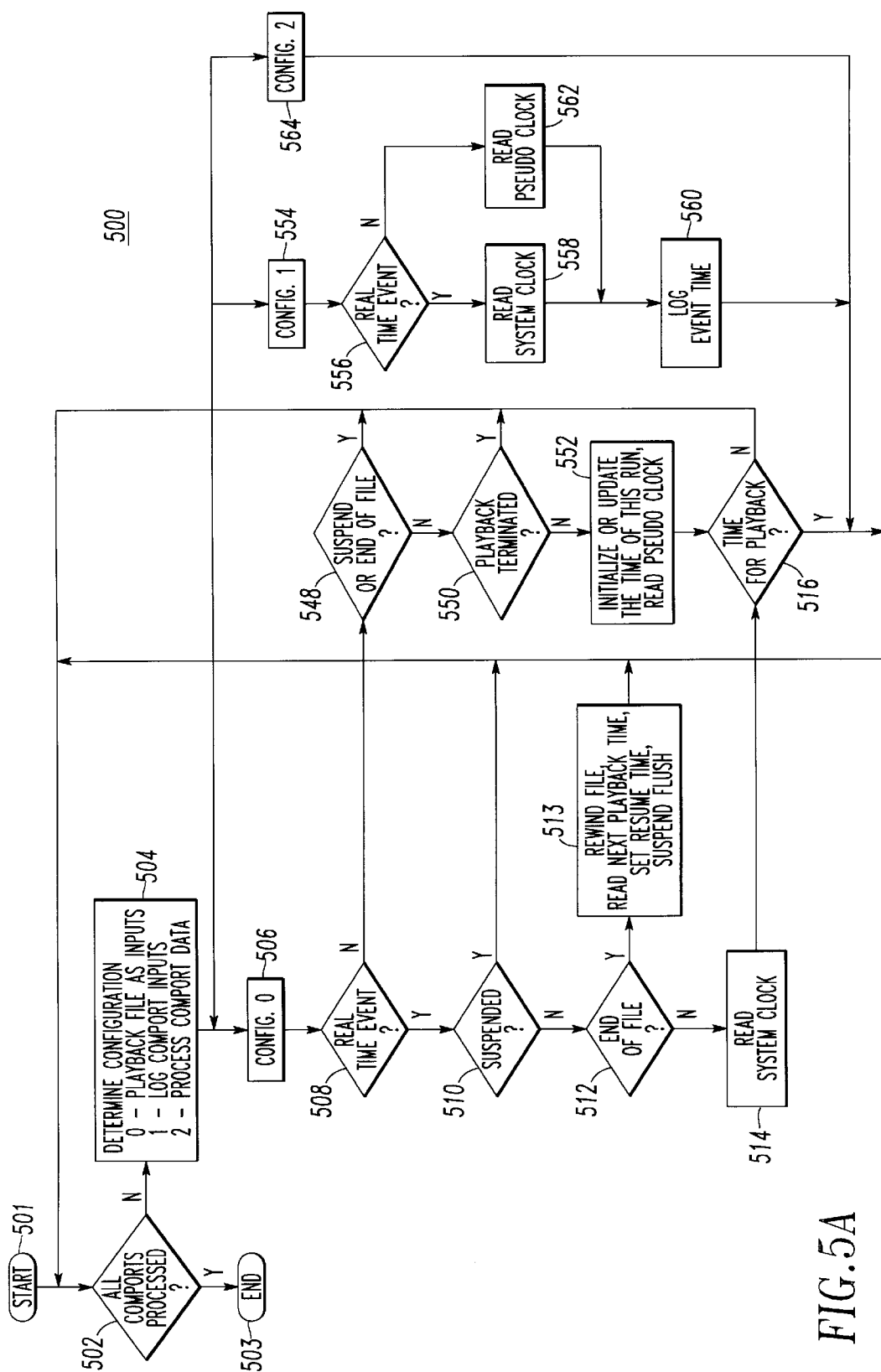
FIG. 5 is a detailed flow chart illustrating a receive message background task component of the present invention.
Figure 5B:
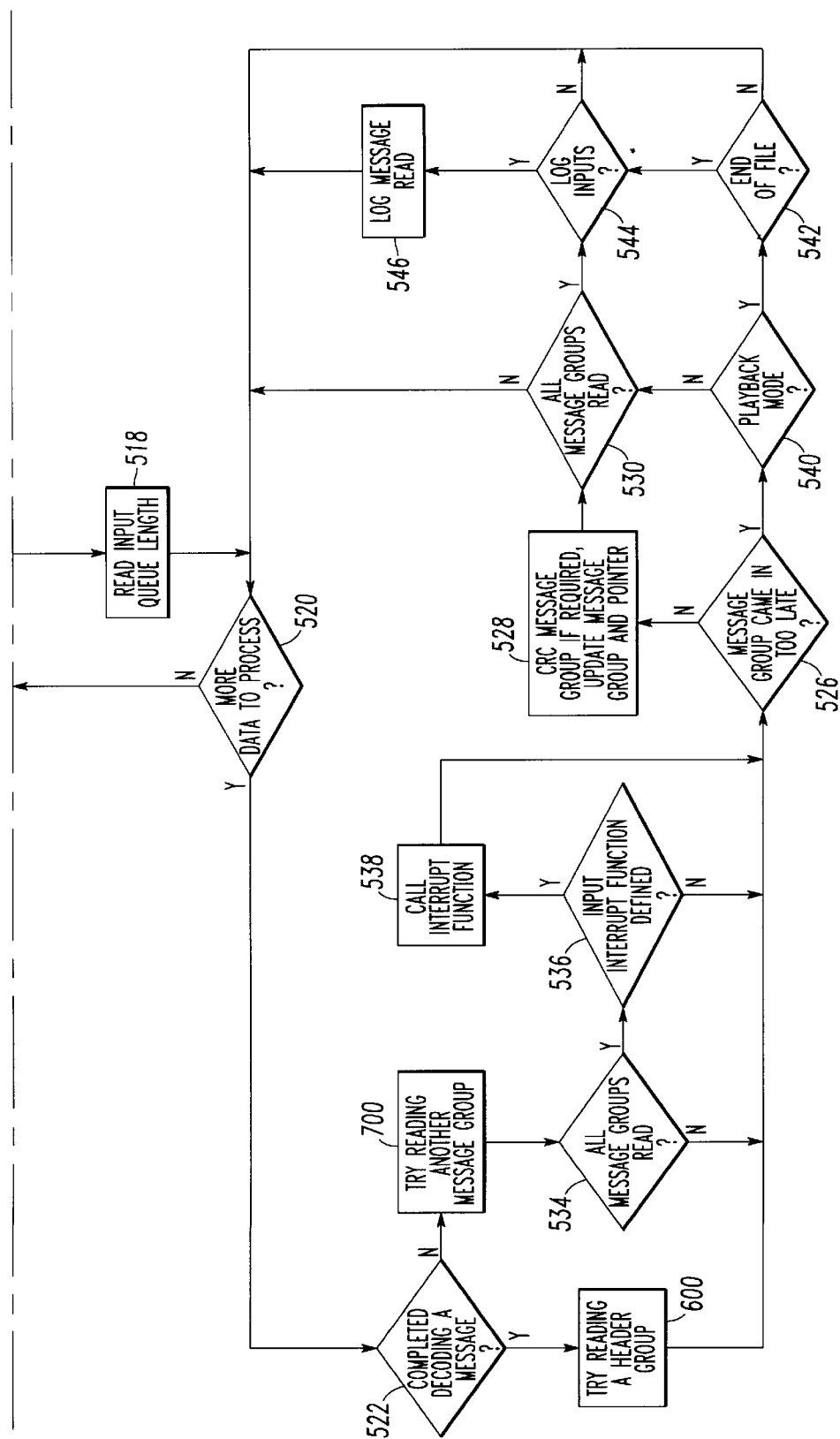

The receive message background routine 500 which is generally described above may be specifically implemented as shown in the flow chart of FIG. 5. The receive message background routine 500 is generally divided into three configurations: configuration 0 plays back a recorded file as an input, configuration 1 logs or records COMPORT 162 inputs which may be played back later in configuration 0, and configuration 2 processes input COMPORT 162 data.

More particularly, receive message background routine 500 begins at start step 501 and then proceeds to decision step 502 which checks if all COMPORTS 162 have been processed. If so, then the routine 500 is complete as indicated by end step 503. If, on the other hand, all COMPORTS 162 have not been processed, then the method proceeds to determine configuration step 504 which determines which of the 3 configurations (0, 1, 2) the user desires.

Determine configuration step 504 instructs the menu processor 125 to presents the user with an interactive menu that can be selected by the user to configure the message processor 160 into one of three configurations.

Alternatively, the application program 150 may also configure the message processor into one of three configurations.

More particularly, the first configuration (labelled configuration 1 in the drawings) configures the message processor 160 to log input messages received via COMPORT 162 by controlling the input/output message utility 164 to record the received messages in memory 165 to create a message log.

The second configuration (labelled configuration 2 in the drawings) process input messages received via COMPORT 162 by controlling the input/output message utility 164 to route the input message to the message encode/decode utility 166 to decode the input message and then send the decoded input messages to the application program 150 via message queue 168.

The third configuration (labelled configuration 0) configures the message processor 160 to playing back an previously recorded input message from the message log in memory 164 and sending the read input message to the application program 150 via message queue 168.

Configuration 2 (Process Input COMPORT Data)

Continuing the description of the determine configuration step 504, if configuration 2 is selected by the user via the operator interface and menu processor 125, the invention proceeds to process data received from COMPORT 162 as indicated by configuration 2 step 564.

Then, the invention reads the input queue length in step 518. The input queue length determined in step 518 is then utilized by decision step 520 which determines whether there is enough data to process from the COMPORT 162. If there is more data to process (the input queue has not been exhausted), the method proceeds to completed decoding a message decision step 522.

If completed decoding a message decision step 522 decision step 522 determines that a message has been completely decoded or, the first message to be decoded has been received, then the method proceeds to read a header group step 600. Read a header group step 600 is also utilized in the method shown in FIG. 2 and is more particularly described in reference to FIG. 6 below.

If decision step 522 determines that the message is not completely decoded, then the flow proceeds to read another message group step 700. It should be noted that read another message group step 700 is also utilized in FIG. 2 and is more particularly described in relation to FIG. 7 below.

Then, the invention determines whether all message groups have been read in step 534. Step 534 is accomplished by utilizing the header group parsed by step 600 to access the message database 105 to thereby determine how many message groups are to be expected within the received message. If all message groups have not been read, then the method proceeds to step 526 described in detail below. If, on the other hand, all message groups have been read, then the method proceeds to decision step 536 which determines whether the input interrupt function has been defined. If so, then a call interrupt function is invoked by step 538 to interrupt the application program 150 so that application program 150 can thereby accept the decoded message.

As shown in FIG. 5, after trying to read a header group in step 600, or after all message groups have not been read in step decision step 534, or after a determination by decision step 536 that the input interrupt function has not been defined, or after a defined interrupt function has been executed, then the method proceeds to a series of decision blocks beginning with decision step 526.

Decision step 526 determines whether the message group came in too late. In other words, there is a time limit in which a message group must be received. Exceeding this time limit (which is defined in open configuration file step 405 that reads the time-out for a given message) corresponds to the situation in which a communications channel has been broken or the message otherwise interrupted or delayed so that the newly received message group should not be considered a part of the current message being decoded.

If the message group did not come in too late and should be considered part of the message being decoded, then the flow proceeds to data integrity check step 528 which utilizes the CRC integrity check mentioned above. Then, the flow proceeds to decision step 530 which determines whether all message groups have been read. If not, then the flow skips back to decision step 520 that determines whether there is more data to process (more data in the input queue to be decoded).

Returning to message group came in too late decision step 526, if the message did come in too late and should not be considered part of the message being decoded, then the method then proceeds to playback mode determination step 540.

Playback mode determination step 540 is a test that determines whether configuration 0 (playback mode) has been selected by the user. Keeping with configuration 2, playback mode determination step 540 will then decide that configuration 0 (playback mode) has not been selected and then directs the flow to all message groups read decision step 530 which is described above.

Decision blocks 542, 544, and 546 will be described with reference to configuration 0 (playback mode) below.

Configuration 0 (Playback File As Input Data)

Further continuing the description of the determine configuration step 504, if configuration 0 is selected by the user via the operator interface and menu processor 125, flow proceeds to configuration 0 indication step 506 and then to real time event decision step 508. Real time event decision step 508 discriminates between a real time event to be played back faithfully and a sequence of events to be executed as quickly as possible until it arrives at some defined breakpoint where it is suspended. When playback is suspended, the user may repeat the process by resuming playback and sequence to the next breakpoint or single step through each subsequent event to analyze a particular situation. If the playback is to be done in real time, then the flow proceeds to suspended operation determination step 510. More particularly, step 510 determines whether the real time event has been suspended.

If the real time event has not been suspended, then the flow proceeds to end of file decision step 512. If playback has not reached the end of the file (the file is not empty and there is remaining data to be played back), then the flow proceeds to read system clock step 514.

Read system clock step 514 reads the system clock so that the playback can be synchronized with a real time event. Then, the flow proceeds to time for playback decision step 516. More particularly, decision step 516 determines whether the time has occurred in which the playback file should be fed into the system as an input by utilizing the system clock read in step 514. If it is not time for playback, the flow skips back to the beginning of the method starting with decision step 502 which is described above. If, on the other hand, the time has arrived for playback of the file as an input, the method then proceeds to read input queue length step 518 which is described above.

After decoding the message being played back utilizing steps 522, 600, 700, 534, 536 and 538 as described above, and determining that the message group has come in too late, the flow proceeds to playback mode determination step 540.

More particularly, playback mode determination step 540 determines whether the playback mode (configuration 0) has been selected. If so (as here), then a message group which has come in too late may be included within the current message being decoded. In other words, the playback mode does not impose a strict time window in which a message group must be received to be considered part of the message being decoded. If playback determination step 540 determines that configuration 0 (playback mode) has been selected, then the flow proceeds to end of file determination step 542. If the end of file has not been reached, step 542 proceeds to more data to process decision step 520. If, on the other hand, the end of file has been reached, end of file decision step 542 directs the process to log input decision step 544.

Log input decision step 544 determines whether the inputs should be logged or recorded. In other words, has configuration 1 (log COMPORT inputs) been selected. If so, then the method proceeds to log message read step 546 which logs or records the current message being read. Otherwise, log inputs decision step 544 proceeds to more data to process decision step 520.

Returning to real time event decision step 508, if step 508 determines that there is no real time event, then the flow proceeds to suspended or end of file decision step 548. Step 548 determines whether the playback has been suspended or whether the playback has reached the end of the file. If so, then the flow jumps back to all COMPORTs processed decision step 502 which is described above. If, on the other hand, the playback has not been suspended or the end of the playback file has not been reached, then decision step 548 directs the process to playback terminated decision step 550. If the playback has been terminated, step 550 directs the process back to step 502.

If, on the other hand, the playback has not been terminated, the process proceeds to step 552 which initializes or updates the time of this run and reads the pseudo clock. A pseudo clock is typically a counter which increments by the delta between events to skip over idle times. The value of the pseudo clock replaces the system clock and thereby allows events to be processed as soon as possible.

Then, the method proceeds to time for playback decision step 516 which determines whether the time has arrived for playback. If not, the process skips back to the beginning of the method at step 502. If yes, the method proceeds to read input queue length step 518 which is described above.

Configuration 1 (Log Comport Inputs)

To complete the description of the determine configuration step 504, if configuration 1 is selected by the user via the operator interface and menu processor 125, the flow proceeds to configuration 1 step initialization 554 which initializes configuration 1. Then, real time event decision step 556 determines whether a real time event is being logged. If a real time event is being logged, then the system clock must be read to provide an appropriate time stamp for each event as indicated by read system clock step 558.

If the event being logged is not a real time event, then a pseudo clock must be accessed to determine a pseudo time stamp for the event as indicated by read pseudo clock step 562.

After the appropriate clock has been read, a time stamp is recorded for the event as indicated by log event time step 560.

Then, the flow proceeds to read input queue length step 518 which is described above.

Read A Header Group Routine 600

The high-level flow chart shown in FIG. 2 broadly illustrates read a header group step 600 which parses the header group 312 from the message to identify the format of the received message. FIG. 6 describes a particular implementation of this read a header group step 600 and is shown in flow chart form.

More particularly, read a header group subroutine 600 begins with start step 602 and then proceeds to playback mode determination step 604 which determines whether the playback mode (configuration 0) has been selected such that a previously recorded file is being played back as if it were being received.

If step 604 determines that the playback mode has been selected, then step 606 is executed which reads the size of the logged message. On the other hand, if the playback mode has not been selected, then step 608 is executed which reads the size of the input queue. In either case, steps 606 and 608 determine the size of the received message (logged message or message in the input queue, respectively).

The implementation shown in routine 600 utilizes a flag to indicate whether the header group 312 has been found. To initialize this flag, step 610 sets this flag at an initial state indicating that the header has not yet been found.

Then, the method tests whether there are more bytes in the input message to read in step 612. Step 612 may perform this process by, for example, utilizing a counter and comparing the counted number of bytes read against the size of the logged message or the size of the input queue read by steps 606 and 608, respectively.

If there are more bytes to read as determined by step 612, then the flow proceeds to playback mode determination step 614 which is similar to playback mode determination step 604. In this case, however, if the playback mode has not been selected, then the method reads data from the input queue as indicated by read a byte from queue step 616. On the other hand, if the playback mode has been selected as determined by step 614, then the input data is read from the logged file in memory device 165 as indicated by read a byte from file step 632.

After the byte has been read from the input queue in step 616, the flow proceeds to log input determination step 618 which determines whether the input is to be logged (recorded). If not, the flow proceeds to step 620.

Steps 620 and 622 form a loop which matches the header byte read from steps 616 or 632 against the message database 105. This loop begins with step 620 which determines whether there are more message types to check in the message database 105. If there are more message types to check, then step 622 attempts to match a header byte (read in steps 616 or 632) with a byte from a message type field stored in the message database 105.

If no match is found, then the method loops back to step 620 which again checks whether there are other types of messages remaining against which the current header byte may be matched. This loop continues until the current header byte is matched wherein the flow proceeds to step 624 or until there are no more message types to check wherein the flow proceeds to step 612.

If there are no more message types to check, then it is possible that the byte read in steps 616 or 632 is not a header byte. Therefore, the method proceeds to step 612 which checks whether there are more bytes to read and then, reads another byte from the queue (step 616) or the file (step 632) and labels the read byte as the new, current byte which then becomes the subject of the byte-matching loop described above to see if this byte matches a byte from the message type field stored in the message database 105.

If the current header byte does match, then the flow proceeds to update match status step 624. Update match status step 624 then associates the message format definition with the matched header byte in the message database 105 and keeps track of how many matches were found thus far.

Then, the method tests whether all bytes have been matched in step 626. If so, then the flag is altered to indicate that the header has been found as indicated by flag header found step 628. Then, the flow proceeds to return flag step 630 and then to end step 636.

If, on the other hand, all bytes have not been matched as determined by decision step 626, then the flow returns to more bytes to read determination step 612 which is described above.

If there are no more bytes to read as determined by step 612, then the method returns the flag in step 630 and is finished as indicated by end step 636.

Returning to log input determination step 618, if the input is to be logged (configuration 1), then the flow proceeds from step 618 to step 634 which writes the byte read from the input queue in step 616 to a log file in the memory device 165 as indicated by write byte to log file step 634. Then, the flow proceeds to more message types to check step 620 which is described above.

Read a Message Group Routine 700

After parsing the header group 312 and identifying the format of the message including the format of the groups and fields within the message hierarchy, the next major step is to read a message group as shown in FIG. 2 and specifically by read a message group step 700. The read a message group step 700 may be specifically implemented by the subroutine or collection of substeps shown in FIG. 7.

More specifically, the read a message group routine 700 begins with start step 702 and then proceeds to playback mode determination step 704 which determines whether the message group is being played back from a previously logged file or is being read from the input queue.

If the playback mode has been selected as determined by playback mode determination step 704, then the size of the message must be determined as indicated by read size of logged message step 706. On the other hand, if the playback mode has not been selected, then the size of the message must be determined from the input queue as indicated by read size of input queue step 708. In either case, the flow then proceeds to step 710.

Step 710 then determines whether the size of the input message is at least the size of a current group. If not, then an error has occurred and the read a message group subroutine is stopped by proceeding to end step 764.

If this size determination step 710 finds no error, then the next step is to determine whether the current group is the delimiter group 319. In other words, step 712 checks whether the current group is the delimiter group which is appended at the end of the message to delimit or demarcate the end of the message. If the end of the message has not been reached as determined by step 712, then the flow proceeds to step 714.

Step 714 then determines whether there are more fields to decode. Referring to FIG. 3, step 714 generally tests whether all of the fields within the current group being decoded have been processed (decoded). If there are remaining fields to decode as determined by step 714, then the flow proceeds to step 716.

Step 716 is another test which determines whether there are more bytes needed to complete the current field being decoded. If there are more bytes needed to complete the field before decodation can proceed, then the flow proceeds to step 718.

Step 718 is another playback mode determination step which decides where to find the bytes needed to complete the field being decoded. If the playback mode has been selected, then the bytes are read from the logged file as shown by read bytes from file step 720. On the other hand, if the playback mode has not been selected, then the bytes are read from the input queue as shown by read bytes from queue step 722. After step 722, the method then determines whether the input (the bytes read from the queue) should be logged as indicated by log input determination step 724.

If the input bytes are to be logged, then the bytes are written to a log file in memory device 165 as indicated by write bytes to the log file step 726.

After steps 720, 726, or 724, the flow then proceeds to step 728 which converts the input byte to an unsigned integer representation.

If block memory transfers are not economical for small amounts of data as in these fields 314, it is usually more efficient to move data from memory utilizing the full width of the bus rather than moving a number of odd bytes at a time based on the data format. In the current implementation, the data is usually unsigned integer, so step 728 takes advantage of this trend by type casting all data into the unsigned integer format for temporary storage for and/or transmission to steps 734, 742 and 758 permitting access to the data by use of a union data structure.

Then, step 730 is performed which checks whether the input byte is a CRC group. As explained above, CRC groups are utilized to insure data integrity. If the input byte is not a CRC group as determined by CRC group determination step 730, then the flow proceeds to step 732.

Step 732 determines the type of field that has been read by the previous steps. Field type determination step 732 performs this process by utilizing the parsed header group 312 that was parsed in read a header group subroutine 600 and compared with the message database 105 to determine the format of the message and thereby the type of each field within the current message group.

If field type determination step 732 determines that the field type is a string type of field, then the flow proceeds to type string step 734 which initializes decoding of a string type of field. Thereafter, step 736 is executed which saves the field to a message buffer and then to match determination step 738.

Match determination step 738 determines whether the string in the string type field stored in the message buffer needs to be matched. The string is matched against a filter template defined by the user in the configuration file. Note that if the filter option is not utilized, the response to step 738 is NO.

If the string should be matched, then string matching step 740 is performed. If a match is found, then this field has been completely processed and the flow returns to step 714 which determines whether there are more fields to decode in the current group as described above.

If the field type determination step 732 determines that the field type is a signed integer type of field. Then the flow proceeds to type signed step 742 which initializes decoding of a signed integer type of field. Thereafter, the flow proceeds step 744 which extracts the data sign bit and invalid data sign bit from the signed integer field. Step 746 continues this process by determining whether the invalid data sign bit has been defined. If yes, then step 748 sets or clears the invalid flag. If no, then step 748 is skipped and step 750 then executed.

Step 750 determines whether the data is outside the expected range. If not, then step 752 is executed which converts the integer to a value defined by the bit value and bit value position.

Continuing the decodation of a signed integer type of field, step 754 is then executed which type casts the integer to a desired data type such a character, short, long, float, double, etc. Then the current field is saved in the buffer in steps 756 and the flow returns to step 714 which determines whether there are more fields to decode in the current group.

If field type determination step 732 determines that the field type is an unsigned integer, then step 744 (which extracts the data sign bit and invalid data sign bit from the field) is skipped because it is unnecessary and the flow then continues with step 746 which is described above.

Returning to step 730: if the input byte is a CRC group, then the input byte is not part of the message and, therefore, the flow proceeds to CRC matching step 760. CRC matching step 760 completes the data integrity check. An unsuccessful match means that an error in the data transmission has occurred or that the data integrity has failed. Thus, the flow will then proceed to set error status step 766 and then to end step 764.

If, on the other hand, the data integrity check is passed and the CRC group does match, then the flow proceeds to update message status step 762 and then to end step 764.

Completing the flow diagram, if step 712 determines that the input group is the delimiter group indicating that the end of the groups has been reached, then the flow proceeds to a playback mode determination step 768. As above, if the playback mode has been selected, then the bytes are read from a recorded file as indicated by read bytes from file step 778. On the other hand, if the playback mode has not been selected, then the bytes must be read from the input queue as indicated by read bytes from input queue step 770. Thereafter, the method then tests whether the input should be logged in step 772. If so, then the input bytes are written to a log file in write bytes to log file step 774. After step 778, a no indication on log input file determination step 772 or after the bytes have been written to a log file in step 774, the flow proceeds to step 776.

Step 776 decides whether the delimiter bytes match. If not, then an error has occurred as indicated by set error status step 766. If the delimiter bytes do match, however, then the flow proceeds to step 762 which updates the message status. After either steps 766 or 762, the subroutine 700 ends as indicated by end step 764.

Furthermore, step 712 determines whether the current group is expected to be the delimiter group 319. At this stage, the process has not even read the delimiter bytes 319 yet. After the delimiter bytes 319 are read in step 770 or 778 the process still has to check to see if the delimiter bytes 319 are a match.

Message Encodation Routine 800

As shown in FIG. 2 and described above, this invention also has the capability of encoding data into an inter-computer message having a desired format. This encodation step is shown in FIG. 2 as encode message step 800 and is followed by transmit message step 900.

Together, the sequence of steps including the encode message step 800 and-the transmit message step 900 form a transmission mode which may be selected by the user with the menu processor 125 which presents the user with an interactive menu that can be selected via the user interface.

The transmission mode in configuration 0 (playback) plays back the input message from the message log in memory device 165 and then sends the read input message to the message encode/decode utility 166 to encode the message then transmits the encoded message using message transmission routine 900.

The transmission mode in configuration 1 (log) encodes the messages in message encode/decode utility 166 using message encoding routine 800, and then transmits the encoded message with the transmit message routine 900 while storing the encoded message being transmitted in the message log in memory device 165.

Alternatively, the application program 150 may initiate the transmission mode.

The user interface also permits the user to designate a particular message format from message database 105 which will then be utilized to encode the message using encode message routine 800.

Figure 8A:
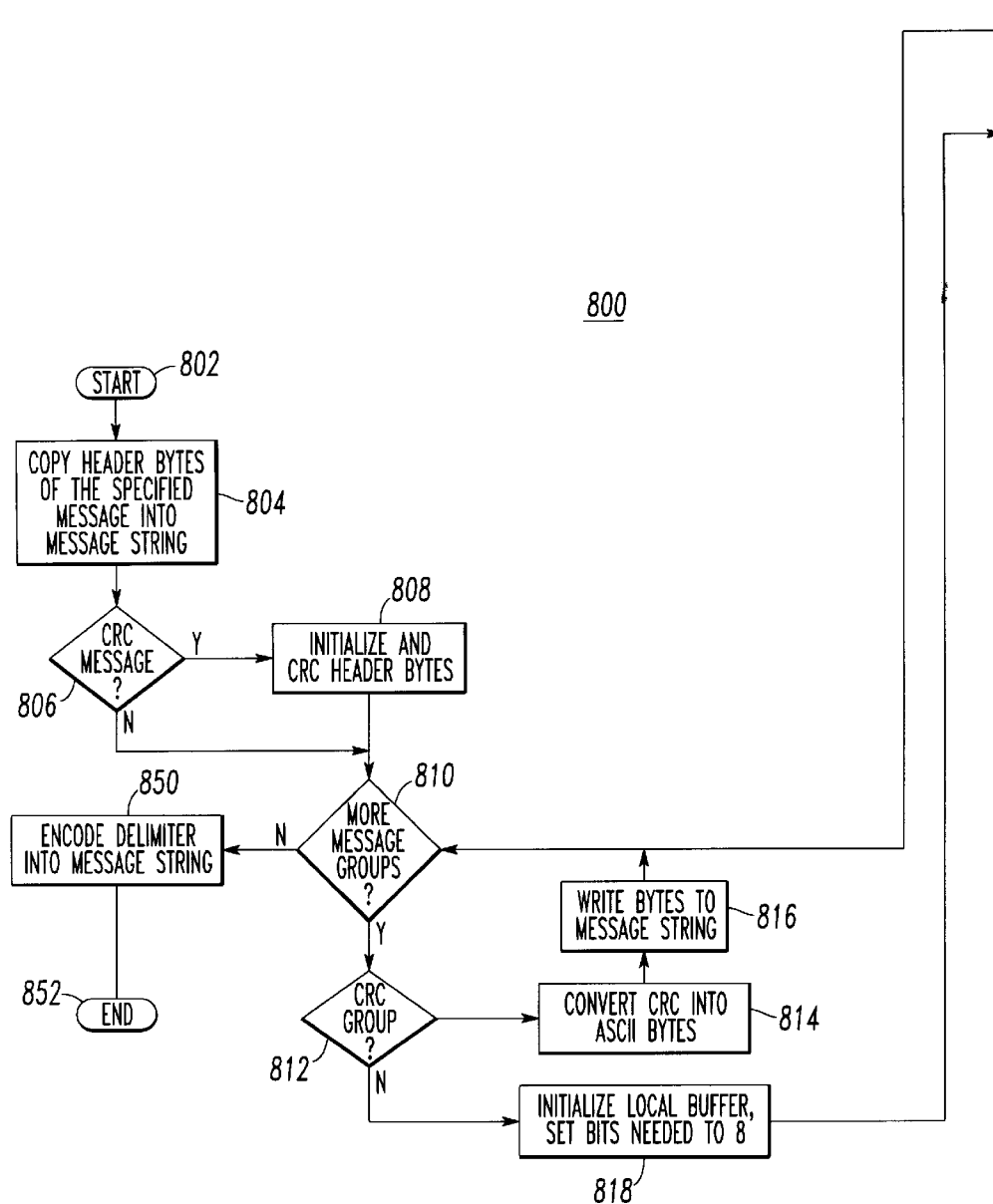
FIG. 8 is a detailed flow chart describing message encodation which is yet another component of the present invention.
Figure 8B:
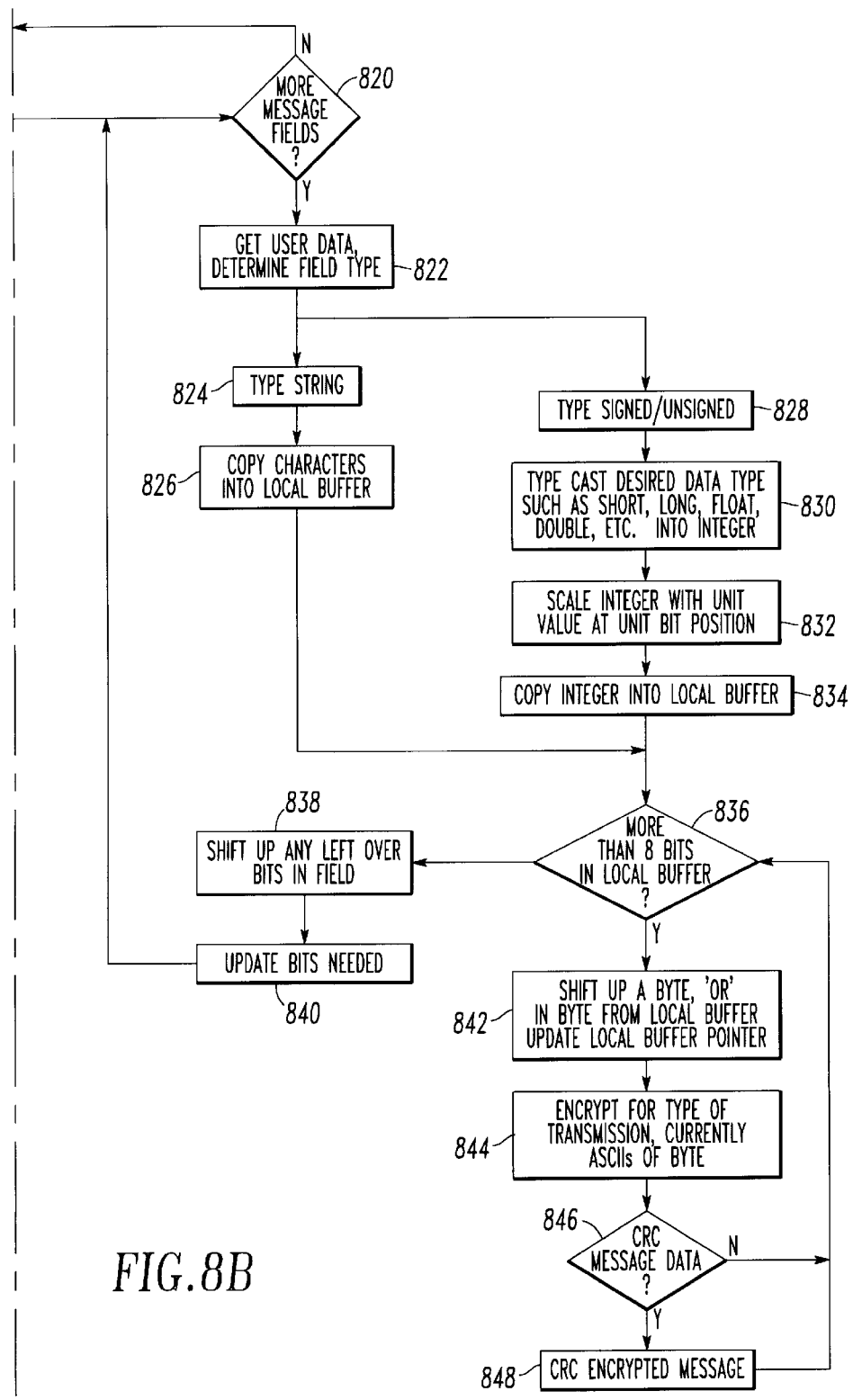

FIG. 8 is a specific implementation showing substeps which may be utilized to perform the message encoding step 800.

More particularly, the message encoding subroutine 800 begins a start step 802 and then executes copy header group step 804 which starts building the message string by copying a header group of a specified message into the message string. The message format may be specified by the user with mouse 110 or keyboard 114 with reference to the user configuration file 100.

Then, decision step 806 determines whether the CRC message group data integrity check is to be utilized with the encoded message. If so, then a CRC header byte is initialized in step 808. If not, step 808 is skipped and the flow passes to step 810.

Step 810 is a decision step which sets up a recursive loop by testing whether there are more message groups to be included in the current message being encoded. If step 810 determines that there more message groups to be included in the message, then step 812 is executed.

Step 810, like step 806, determines whether the CRC message group data integrity check is to be included in the encoded message. If so, then step 814 is executed which converts the CRC into ASCII bytes and then step 816 is performed which writes the converted ASCII bytes into the message string. The flow then loops back to step 810 which again determines whether more message groups are to be included in the current message.

Returning to CRC group decision step 812, if this step determines that a CRC group is not to be included or, has already been included, then the flow proceeds to step 818 which initializes a local buffer and sets the bits needed to, for example, 8 bits. Because almost all data formats and communication protocols are in multiples of bytes, or 8 bits, this particular implementation requires that there be at least a byte before an encode is attempted on the data. This imposes a requirement that all message groups be multiples of bytes. However, it does not require that fields have at least a byte width. The number 8 is for chosen implementation efficiency and is not a requirement on the algorithm and could be generalized to n where n is greater or equal to 1.

Then, a nested, recursive loop is performed beginning with decision step 820 which decides whether there are more message fields to be included within the current message group. If there are more message fields to be included within the current message group being encoded, then the flow proceeds to step 822.

Step 822 retrieves user data that is to be encoded in the inter-computer message and also determines the field type by, for example, asking the user to input the desired field type or by accessing the user configuration file 100.

Depending upon the field type selected by step 822, the flow proceeds to either step 824 or step 828 as shown in FIG. 8.

If the field type is a string type of field, then the flow proceeds to step 824 which initializes the string type of field. Then, step 826 copies characters into a local buffer to assemble this string type field. On the other hand, if the field type is a signed or unsigned numerical field, then the flow proceeds from step 822 to step 828 which initializes the signed/unsigned field type. Then, step 830 type casts desired data type such as character, short, long, float, double, etc. into an integer. Any numerical data format, whether it is a floating point or a signed integer, is a sequence of bits encoded to represent a value. At this point, it is no longer necessary to view the data as some numerical format but as a sequence of bits. For convenience, it is viewed as an integer at step 830.

Thereafter, step 832 scales the integer data value with a unit value at a unit bit position. Doubles and longs which occupy more bits than an integer width are viewed as multiple integers with a scale applied at the unit bit position of the higher integer. This scale is implied by step 832. Actual scaling is done to pack a number into a field of fewer bits than the data format. Significance preserved is dictated by the unit value at the unit bit position and the number of field bits given to the data.

After scaling the integer in step 832, step 834 copies the integer into a local buffer to build the signed/unsigned type field for the current message group.

After either step 826 or step 834 is performed, then the flow passes to decision step 836 which tests whether more than 8 bits are in the local buffer. This is because once the data is translated into an integer in the local buffer with the amount of field bits desired, it is no longer a multiple of bytes. Multiple fields are concatenated until there are at least 8 bits or a byte in the local buffer before further processing in step 842.

If there are more than 8 bits in the local buffer, then step 842 shifts up a byte and OR's in a byte from the local buffer and then updates the local buffer pointer. In this way, a buffer of bits are built up to a buffer of bytes.

Then, step 844 encrypts the field for the type of transmission (currently ASCII code for the byte). ASCII code is used in this implementation because it happens to be byte wide and numbers can be represented as decimals with digit codes that cannot be confused with alphabets or transmission codes. Nevertheless, any data encryption algorithm can be used here because the data can now be viewed as a bit pattern with no particular meaning.

Then, another CRC message data decision step is performed in step 846. If CRC data integrity check is desired, then step 848 encrypts the message using CRC message groups and, if not, the flow returns to step 836.

If step 836 determines that there are not more than 8 bits in a local buffer, then the flow moves to step 838 which shifts up any left-over bits in the current field. Thereafter, the flow proceeds to step 840 which updates bits needed in the current field. Sometimes a field may only be a bit wide and cannot be encrypted using the ASCII encryption algorithm. Therefore, the flow gathers up more fields until it has 8 bits. This is possible because this implementation requires that the total number of bits of all field in a group be a multiple of bytes.

Thereafter, the method loops back to decision step 820 to test if there are more message fields within the current group being encoded. If so, then another field is built according to the method described above. If not, then the method loops back to step 810 which tests whether there are more message groups within the current message being encoded. If so, then another message group is built according to the methods described above.

If step 810 determines that there are no more message groups within the current inter-computer message being encoded, then the flow proceeds to step 850 which tacks on the (optional) encoded delimiter 319 at the end of the message string. Thus, the entire inter-computer message has been encoded and the method stops as indicated by end step 852.

Transmit Message Routine 900

Figure 9:
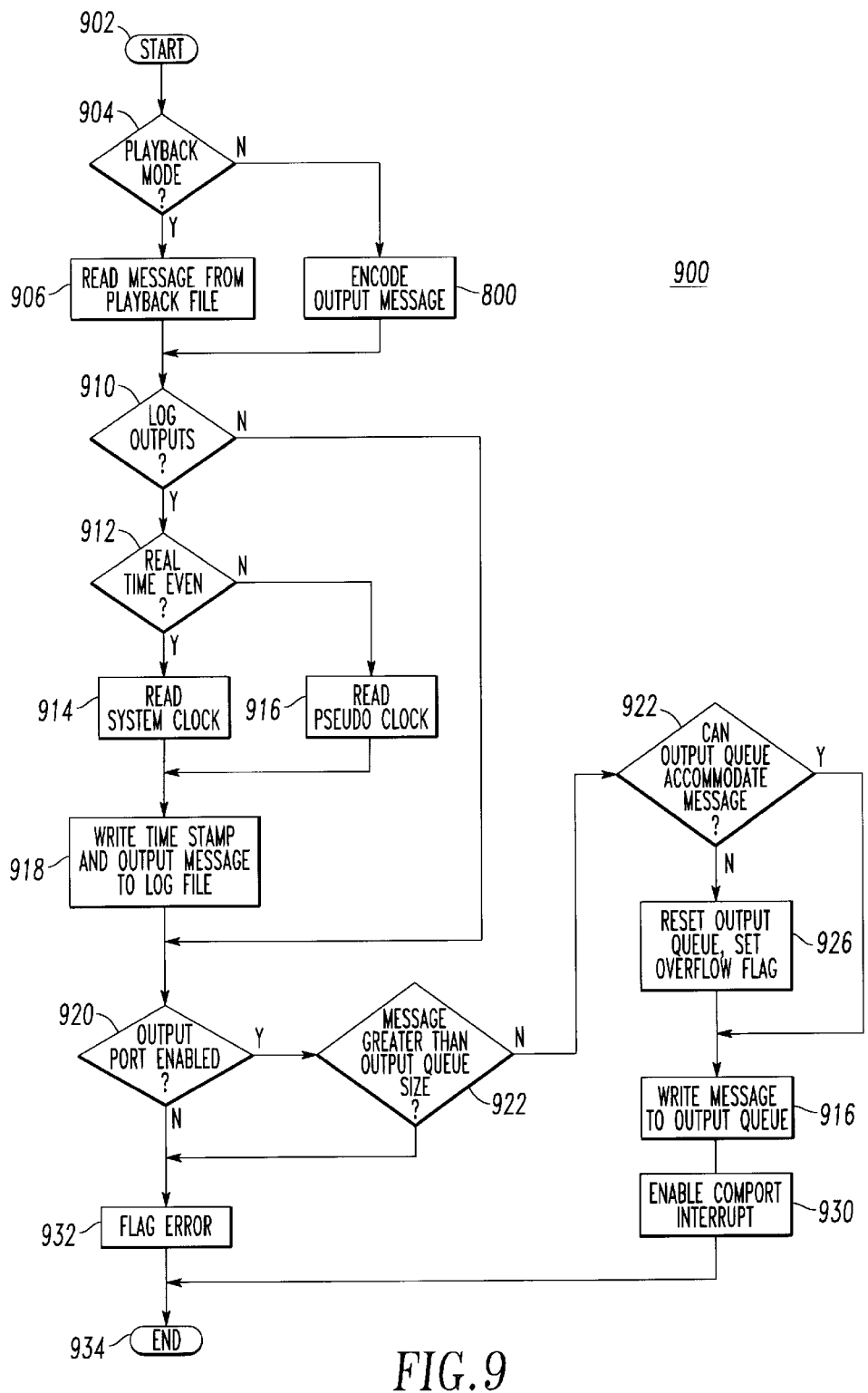
FIG. 9 is a detailed flow chart illustrating a transmit message routine component of the present invention.

After the inter-computer message has been encoded with the encode message routine 800 shown in FIG. 2 which may be specifically implemented as in FIG. 8, the message may then be transmitted using transmit message step 900. FIG. 9 shows a particular implementation of transmit message step 900 which may be utilized in the present invention.

More particularly, the transmit message step 900 may have a plurality of substeps as shown in FIG. 9 beginning with start step 902 and then proceeding to playback mode determination step 904. Like other playback mode determination steps above, playback mode determination step 904 determines whether the message to be transmitted has already been encoded and is merely being played back for that transmission as indicated by read message from playback file step 906. On the other hand, if the playback mode is not being utilized, then the message must be encoded by using the message encodation step 800 which is described above.

Thereafter, the procedure decides whether the output is to be logged as indicated by log output determination step 910. If so, then the method then determines whether the output being logged is a real time event as indicated by real time event determination step 912. If a real time event is being logged, then the system clock is read as indicated by read system clock step 914. On the other hand, if the event being logged is not a real time event, then a pseudo clock must be read as indicated by read pseudo clock step 916.

After the appropriate clock has been read, then the event may be properly logged with a time stamp as indicated by write time stamp and output stamp message to log file step 918.

After logging the output or after the log output subroutine has been skipped by log output determination step 910, then step 920 is executed which determines whether the output port has been enabled. If the output port has been enabled as determined by step 920, then the method determines whether the size of the message is greater than the output queue size as indicated by step 922. If the message will fit in the output queue, then step 922 directs the process to step 924 which determines whether the output queue can accommodate the message.

Step 922 insures that the output queue is at least as large as the longest message. Step 924 insures that the output queue can accommodate the current message that is still awaiting transmission. These two conditions cause different errors to be presented to the system: one is a queue sizing error and the other is a miscalculation of system throughput. The user needs to recognize which error has occurred.

If step 924 determines that the output queue cannot accommodate the message, then the process proceeds to step 926 which resets the output queue and sets the overflow flag.

After performing step 926 or after bypassing step 926 via determination step 924, then the message is written to the output queue as indicated by write message to output queue step 928. Thereafter, the COMPORT interrupt is then enabled as indicated by enable COMPORT interrupt step 930. The message is then available in the COMPORT for acceptance by another computer, application program, etc.

If step 922 determines that the size of the message is greater than the output queue size, then the output queue cannot be utilized to transmit the message and an error has occurred as indicated by flag error step 932. Flag error step 932 is also executed when the output port enabled cannot be enabled as determined by output port determination step 920. After flagging this error in flag error step 932, the transmit message routine 900 is completed as indicated by end step 934.

ADVANTAGES OF THE INVENTION

As described above, this invention is extremely versatile and permits inter-computer messages to be received, transmitted, encoded and decoded into any data format desired. A new data format can be easily added by merely defining the data format in the user configuration file 100. In other words, the conventional process of rewriting code to accept a message having a new format is avoided by the present invention.

Furthermore, the present invention has the capability of preserving the sequence of events as input by the user by recording these inputs in a log file. Furthermore, such recorded log files may then be played back upon command for such purposes of debugging an application program or for marketing demonstrations. The invention also has the capability of time stamping the inputs as they are written to a log file.

Furthermore, data inputs may come from various sources. In most personal computers, there are several communication ports (COMPORTs) along with the keyboard and mouse. By utilizing this invention, all communication ports have the ability of accepting and logging live inputs or playing back data files in real time or in single step mode to debug a particular application. Also, interactively simulated inputs may also be taken from the keyboard or mouse and application inputs may also be injected as another data source.

Furthermore, this invention does not have to reside together with the application program 150. As an alternative, the invention may be installed on a dedicated communication processor which frees the host processor from handling low level I/O interrupts. The host will then only be interrupted upon receipt of a completely received and decoded message and the host can send a message without having to constantly service a communication port.

With this invention, there is no need to write specialized communication software. The system designer only has to define the message contents in an ASCII configuration file (user configuration file 100). As an added benefit, no additional design is required for I/O logging, simulations or scenario playback. Demonstrations may be pre-recorded and automatically played back. Customers may validate the application program 150 by injecting input data directly over the keyboard and mouse.

The user configuration file 100 disclosed above is preferably an ASCII configuration file because it easily enables a user to define the format of messages. The printed appendix following the detailed description illustrates a particular implementation of the inventive concepts disclosed herein.

Preceding the program code is an ASCII configuration file utilized by the code which serves as an example of the preferred ASCII configuration file.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A message processing apparatus for processing inter-computer messages, comprising:

a communications port transmitting messages between the message processing apparatus and another device or application program;

a message log storing input messages from said communications port;

message playback means for playing back stored messages from said message log;

message decoding means for decoding messages;

a user interface providing a user with interactive control of the apparatus by generating control signals in response to user interaction;

a processor executing an application program and receiving control signals from said user interface permitting control of the application program; and a menu processor utilizing said user interface to present a user with a menu of apparatus configurations wherein each apparatus configuration configures the apparatus to perform a different function, said menu processor also permitting the user to select one of the apparatus configurations, wherein the apparatus configurations include a first configuration for processing input messages from said communications port by controlling said message decoding means to decode input messages from said communications port and send the decoded input messages to said processor for manipulation by the application program, a second configuration for playing back an input message from said message log by reading the input message from said message log and sending the read input message to said processor for manipulation by the application program, and a third configuration for logging communications port inputs by routing input messages from said communications port to said message log, said second configuration successively reading a clock to play back the message from said message log at a rate substantially matching a desired rate.

2. The message processing apparatus according to claim 1, further comprising:

a message queue connected to said processor, said message queue storing a queue of messages from said message decoder or said message log depending upon the configuration selected by the user.

3. The message processing apparatus according to claim 1, further comprising:

a control queue connected to said processor, said control queue storing a queue of control signals from said user interface.

4. The message processing apparatus according to claim 1, further comprising:

a control signal memory storing control signals from said user interface when the third configuration is selected by the user via said menu processor and said user interface, a control queue connected to said processor, said control queue storing a queue of control signals from said user interface or said control signal memory depending on whether the first or second configuration has been selected by the user via said menu processor and said user interface.

5. The message processing apparatus according to claim 1, wherein the clock is a system clock, said second configuration successively reading the system clock to play back the message from said message log at a rate substantially matching real time operation and sending the read input message to said processor for manipulation by the application program.

6. The message processing apparatus according to claim 1, wherein the clock is a pseudo clock programmed by the user via said user interface, said second configuration successively reading the pseudo clock to play back the input message from said message log in pseudo time.

7. The message processing apparatus according to claim 6, said second functional configuration including a single step mode selectable by the user via said menu processor and said user interface, wherein the user updates the pseudo time clock via said user interface in the single step mode.

8. The message processing apparatus according to claim 1, further comprising:

message encoding means for encoding messages, said message encoding means connected to said message log, and message transmission means for transmitting encoded messages from said message encoding means, said second functional configuration including a transmission mode selectable by the user via said menu processor and said user interface, said transmission mode playing back the input message from said message log by reading the input message from said message log, sending the read input message to said message encoding means and then sending the encoded message to said message transmission means.

9. The message processing apparatus according to claim 8, further comprising:

a memory device storing an ASCII message format definition file, a message buffer, said message encoding means encoding data into a message format specified by the ASCII message definition file by reading the memory device to access the ASCII message format definition file and extract header data identifying a message format selected by the user via said user interface, copying the extracted header data into the message buffer, reading the ASCII message format definition file to extract format information including a number of groups in the message format and a number and type of fields in each group, and writing data into the message buffer according to the extracted format information extracted, said message transmission means accessing the message buffer to transmit the encoded message.

10. The message processing apparatus according to claim 1, further comprising:

a memory device storing an ASCII message format definition file, said decoding means decoding messages by
receiving the computer message from said communications port,
extracting header data from the received computer message,
matching the extracted header data against header data in the ASCII message format definition file;
determining the format of the message based on said matching step including
determining how many groups are in the message and how many and What types of fields are in each group; and
parsing the computer message into fields according to the determined format to decode the message,
said message decoding means sending the decoded input messages to said processor for manipulation by the application program.

11. A computer implemented method of encoding data into a message format specified by an ASCII message definition file, comprising:
reading the ASCII message format definition file to extract header data identifying the message format,
copying the extracted header data into a message string,
reading the ASCII message format definition file to extract format information including a number of groups in the message format and a number and type of fields in each group, and
writing data into the message string according to the format information extracted by said reading step;
initializing a message database with the ASCII configuration file to define a plurality of message formats wherein each message format includes a number of groups and a number and type of fields in each group,
said reading the ASCII message format definition file to extract header data step including the substeps of accessing the message database to extract the header data corresponding to a desired message format,
said reading the ASCII message format definition file to extract format information step including the substeps of accessing the message database to extract format information associated with the extracted header data and corresponding to the desired message format.

12. The computer implemented method of encoding data according to claim 11,
said reading the ASCII message format definition file to extract format information step reading the ASCII configuration file to determine a number of message formats defined in the ASCII configuration file,
said initializing step including the substeps of recursively intitializing each message format including recursively initializing each group within a current message format, recursively initializing each field within a current group to initialize the message database.

13. The computer implemented method of encoding data according to claim 12, said recursively initializing each field within a current group substep including the substeps of reading a name of, number of bits in and type of a current field from the ASCII message definition file to initialize the message database.

14. The computer implemented method of encoding data according to claim 13, further comprising the step of:
determining if the current field type is a string field type,
said reading the ASCII message format definition file to extract format information step reading match character values from the ASCII message definition file if said determining step determines that the current field type is a string field type.

15. The computer implemented method of encoding data according to claim 13, further comprising the step of:
determining if the current field type is a numerical data field type,
said reading the ASCII message format definition file to extract format information step reading minimum and maximum data range values if said numerical data field determining step determines that the current field type is a numerical data field type.

16. The computer implemented method of encoding data according to claim 13, further comprising the step of:
determining if the current field type is a numerical data field type,
said reading the ASCII message format definition file to extract format information step reading a modulus value if said numerical data field determining step determines that the current field type is a numerical data field type.

17. The computer implemented method of encoding data according to claim 11, said writing data into the message string according to the format information extracted by said reading step including the substeps of:
writing a current group within the message string including recursively writing each field within the current group to build the message string.

18. The computer implemented method of encoding data according to claim 17, wherein if a current field is a string type field said recursively writing each field substep including the substep of copying character data into a local buffer.

19. The computer implemented method of encoding data according to claim 17, wherein if a current field is a numerical type field, said recursively writing each field substep including the substeps of:
formatting numerical data into a field type according to the format information extracted by said reading step, and
copying the formatted numerical data into a local buffer.

20. The computer implemented method of encoding data according to claim 17, further comprising the step of:
transmitting the message string to a device.

21. The computer implemented method of encoding data according to claim 20,
said transmitting the message string step including the substeps of logging the message string being transmitted.

22. A computer implemented method of decoding a computer message, comprising:
receiving the computer message;
extracting header data from the received computer message;
matching the extracted header data against header data in an ASCII message format definition file;
determining the format of the computer message based on said matching step including the substeps of determining how many groups are in the message and how many and what types of fields are in each group; and
parsing the computer message into fields according to the format determined in said determining step to decode each field according to the format determined in said determining step,
said receiving step receiving messages in a first functional configuration for recording received messages in a message log, and a second functional configuration for playing back an input message from the message log, wherein a user can select the first or second functional configurations with a user interface.

23. The computer implemented method of decoding a computer message according to claim 22, wherein the field types include numerical and alphanumerical field types.

24. The computer implemented method of decoding a computer message according to claim 22, further comprising the step of:

finding the computer message in a stream of data by identifying delimiter data, said extracting header data step extracting header data based on a relative position of the delimiter data in the computer message.

25. The computer implemented method of decoding a computer message according to claim 24, further comprising the step of:

transmitting at least one of the fields from the parsed message.

26. The computer implemented method of decoding a computer message according to claim 22, said first functional configuration playing back the input message at a rate determined by a real time clock.

27. The computer implemented method of decoding a computer message according to claim 22, said first functional configuration playing back the input message at a rate determined by a pseudo time clock.

28. The computer implemented method of decoding a computer message according to claim 27, said first functional configuration including a single step mode wherein the pseudo time clock is updated by the user via the user interface.

29. The computer implemented method of decoding a computer message according to claim 22, said second functional configuration recording a real time stamp when recording the input message.

30. The computer implemented method of decoding a computer message according to claim 22, said second functional configuration recording a pseudo time stamp when recording the input message.

31. A computer implemented method of decoding a computer message, comprising:

receiving the computer message;

extracting header data from the received computer message;

matching the extracted header data against header data in an ASCII message format definition file;

determining the format of the computer message based on said matching step including the substeps of determining how many groups are in the message and how many and what types of fields are in each group;

parsing the computer message into fields according to the format determined in said determining step to decode each field according to the format determined in said determining step;

finding the computer message in a stream of data by identifying delimiter data;

said extracting header data step extracting header data based on a relative position of the delimiter data in the computer message; and utilizing at least one of the fields from the parsed message in another computer implemented process.

* * * * *